(12) United States Patent
Matsuo et al.

(10) Patent No.: US 10,638,476 B2
(45) Date of Patent: Apr. 28, 2020

(54) WIRELESS COMMUNICATION DEVICE AND WIRELESS COMMUNICATION METHOD

(71) Applicant: KABUSHIKI KAISHA TOSHIBA, Minato-ku (JP)

(72) Inventors: Ryoko Matsuo, Shinagawa (JP); Toshiyuki Nakanishi, Yokohama (JP); Toshihisa Nabetani, Kawasaki (JP); Hirokazu Tanaka, Bunkyo (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/250,462

(22) Filed: Jan. 17, 2019

(65) Prior Publication Data
US 2019/0174488 A1    Jun. 6, 2019

Related U.S. Application Data

(63) Continuation of application No. 15/265,156, filed on Sep. 14, 2016, now Pat. No. 10,231,233, which is a
(Continued)

(30) Foreign Application Priority Data

Apr. 23, 2014  (JP) .................................. 2014-089551

(51) Int. Cl.
*H04W 72/04* (2009.01)
*H04W 72/12* (2009.01)
(Continued)

(52) U.S. Cl.
CPC ....... *H04W 72/0446* (2013.01); *H04W 72/12* (2013.01); *H04W 74/004* (2013.01);
(Continued)

(58) Field of Classification Search
CPC ............. H04W 72/04; H04W 72/0406; H04W 72/0446; H04W 72/048; H04W 72/12;
(Continued)

(56) References Cited

U.S. PATENT DOCUMENTS 7,826,475 B2 * 11/2010 Lee ....................... H04W 74/02
370/445
7,885,244 B2 * 2/2011 Bhatti ................... H04L 1/1614
370/280
(Continued)

FOREIGN PATENT DOCUMENTS

JP     2007-158529 A    6/2007
JP     2007-521766 A    8/2007
(Continued)

OTHER PUBLICATIONS

International Search Report dated Jul. 28, 2015 inPCT/JP2015/062402 (with English translation).
(Continued)

*Primary Examiner* — Tri H Phan
(74) *Attorney, Agent, or Firm* — Oblon, McClelland, Maier & Neustadt, L.L.P.

(57) ABSTRACT

According to one embodiment, a wireless communication device includes a transmitter configured to transmit a beacon signal including first information to specify a first wireless communication device to be reassigned a slot and a start timing to allow use of a reassigned slot, and transmit, after transmission of the first information, a first signal including second information to specify the reassigned slot, the first signal being a signal different from the beacon signal and a receiver configured to receive a signal.

40 Claims, 20 Drawing Sheets

Related U.S. Application Data continuation of application No. PCT/JP2015/062402, filed on Apr. 23, 2015.

(51) Int. Cl.
 *H04W 74/00* (2009.01)
 *H04W 74/08* (2009.01)
 *H04W 84/12* (2009.01)

(52) U.S. Cl.
 CPC ............ *H04W 74/08* (2013.01); *H04W 84/12* (2013.01); *Y02D 70/142* (2018.01); *Y02D 70/168* (2018.01); *Y02D 70/26* (2018.01)

(58) Field of Classification Search
 CPC ............ H04W 72/1263; H04W 74/00; H04W 74/004; H04W 74/02; H04W 74/06; H04W 74/08; H04W 74/0808; H04W 74/0816; H04W 74/522; H04W 84/12; Y02D 70/26; Y02D 70/142; Y02D 70/168; H04L 12/873; H04J 3/16
 See application file for complete search history.

(56) References Cited

U.S. PATENT DOCUMENTS

| | | | |
|---|---|---|---|
| 8,396,086 B1 | 3/2013 | Gossett | |
| 8,565,138 B1 | 10/2013 | Yuan | |
| 8,767,743 B2 | 7/2014 | Patel | |
| 9,253,110 B2 * | 2/2016 | Ho | H04L 47/522 |
| 9,860,876 B2 * | 1/2018 | Ho | H04L 47/522 |
| 10,039,129 B2 * | 7/2018 | Matsuo | H04W 72/1263 |
| 10,159,042 B2 * | 12/2018 | Matsuo | H04L 5/0048 |
| 10,231,233 B2 * | 3/2019 | Matsuo | H04W 72/12 |
| 2003/0193908 A1 | 10/2003 | Cain | |
| 2004/0090983 A1 | 5/2004 | Gehring | |
| 2005/0170835 A1 | 8/2005 | Ayyagari et al. | |
| 2010/0329231 A1 | 12/2010 | Sekiya | |
| 2011/0176520 A1 | 7/2011 | Patel et al. | |
| 2012/0155279 A1 | 6/2012 | Ho | |
| 2015/0023314 A1 | 1/2015 | Thubert | |
| 2016/0021680 A1 | 1/2016 | Choi | |
| 2016/0183258 A1 | 6/2016 | Matsuo et al. | |
| 2016/0278126 A1 | 9/2016 | Matsuo | |
| 2016/0285507 A1 | 9/2016 | Matsuo | |
| 2017/0070992 A1 | 3/2017 | Matsuo | |
| 2017/0078902 A1 | 3/2017 | Matsuo | |

FOREIGN PATENT DOCUMENTS

| | | |
|---|---|---|
| JP | 2012-503894 A | 2/2012 |
| JP | 2013-115517 A | 6/2013 |
| JP | 2013-182543 | 9/2013 |

OTHER PUBLICATIONS

International Preliminary Report on Patentability and Written Opinion of the International Searching Authority dated Nov. 3, 2016 in PCT/JP2015/062402 filed Apr. 23, 2015.

Yuta Fujiura et al., "A Study on MAC Protocol Guaranteed Delay of Medical Information for BAN" The 33$^{rd}$ Symposium on Information Theory and its Applications (SITA 2010) Nov. 30, 2010, pp. 396-403 (with English Abstract).

* cited by examiner

WIRELESS COMMUNICATION DEVICE AND WIRELESS COMMUNICATION METHOD

CROSS REFERENCE TO RELATED APPLICATIONS

This application is a continuation of U.S. application Ser. No. 15/265,156, filed Sep. 14, 2016, currently pending, which is a continuation application of International Application No. PCT/JP2015/062402, filed on Apr. 23, 2015, which claims the benefit of Japanese Patent Application No. 2014-089551, filed Apr. 23, 2014, the entire contents of all of which are hereby incorporated by reference.

FIELD

Embodiments described, herein relate to a wireless communication device and a wireless communication method.

BACKGROUND

A network called a body area network is known which is formed in a human body as a wireless network. In a body area network, a hub which functions as a central device and nodes which function as terminal devices are attached to a human body and communication is performed between the hub and nodes.

There is a mechanism in which a schedule-based access scheme and a non-schedule-based access scheme; for example CSMA (Carrier Sense Multiple Access), share the same frequency on a time basis. One known schedule-based access scheme is TDMA (Time Division Multiple Access)-based access scheme, which is a simple access scheme and therefore desirable in terms of reduction of power consumption in nodes.

In TDMA, in order to assign a time slot to each node in advance, basically slot assignment information for each node may be inserted in a beacon signal as an announcement signal, such as a beacon signal, which is periodically transmitted at constant intervals. In this case, each node receives the beacon signal, identifies the slot assigned to the node on the basis of the slot assignment information contained in the beacon signal, and performs transmission and reception using the identified slot.

In this method, when a node fails to receive the beacon signal in which the slot assignment information is inserted, a collision can occur because plural nodes may use the same slot. In order to avoid such collision, a mechanism has been proposed in which each node basically heeds to always perform transmission in a slot assigned to the node and, only if the node fails to receive the beacon signal immediately before the slot, the node does not perform transmission in the assigned slot, thereby notifying the hub that the node has failed to receive the beacon signal.

However, the proposed mechanism has a problem that nodes consume higher power because each node needs to transmit in every slot assigned to the node. In addition, because the hub needs to irises assignment information for each node into a beacon signal that the hub periodically transmits, the beacon signal length is increased and the power consumption for receiving the beacon signal is increased accordingly.

DETAILED DESCRIPTION

According to one embodiment, a wireless communication device includes a transmitter configured to transmit a beacon signal including first information to specify a first wireless communication device to be reassigned a slot and a start timing to allow use of a reassigned slot, and transmit, after transmission of the first information, a first signal including second information to specify the reassigned slot, the first signal being a signal different from the beacon signal and a receiver configured to receive a signal.

Below, embodiments of the present invention will be described with reference to the drawings.

First Embodiment

Figure 1:
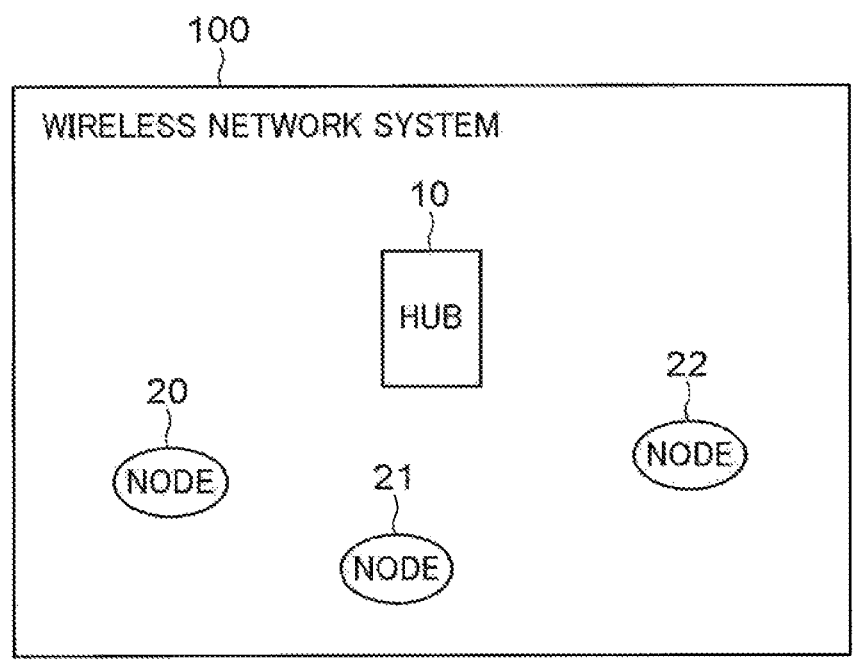
FIG. 1 is a diagram illustrating an example of a wireless network system according to a first embodiment.

FIG. 1 illustrates an example of a wireless network system according to a first embodiment. The wireless network system 100 illustrated in FIG. 1 includes a hub 10 and a plurality of nodes 20, 21, and 22. The hub 10 operates as a central device for the nodes 20 to 22 and the nodes 20 to 22 operate as terminals to the hub 10 (the central device). The hub 10 is provided with a wireless communication device for communicating with the nodes 20 to 22 and each of the nodes 20 to 22 is provided with a wireless communication device for communicating with the hub 10. The wireless communication device provided in the hub 10 is a communication device with which the wireless communication device provided in each of the nodes 20, 21, and 22 communicates and the wireless communication device provided in each of the nodes 20, 21, and 22 is a communication device with which the wireless communication device provided in the hub 10 communicates. Transmission from the hub 10 to the nodes 20 to 22 is called downlink transmission whereas transmission from the nodes 20 to 22 to the hub 10 is called uplink transmission.

The system can be applied to a body area network (BAN), for example. In this case, nodes and a hub are provided on or in a human body. Each of the nodes includes one or more biological sensors and wirelessly transmits sensing information acquired with the biological sensor(s) to the hub 10. Each of the nodes wirelessly acquires information such as control information required for communication from the hub. The biological sensors may be a sleep sensor, an acceleration sensor, a cardiographic sensor, a body temperature sensor, a pulse sensor and the like. Note that the phrase "provided on or in a human body" encompasses placement of sensors in locations near a user such as attaching a sensor to a neck lanyard, holding a sensor in the hand, and placing a sensor in user's belongings such as a pocket of clothing or bag, as well as fixing the sensors to body areas (fingers, wrists, or inside of the body). The system can be applied not only to a body area network but also to any network in which a hub and nodes are provided and communicate with each other. For example, a hub and nodes may be provided in a living body other than a human body, such as an animal or plant, or may be provided in locations of an object other than a living body, such as a car (for example the body and wheels of a car).

Figure 2:
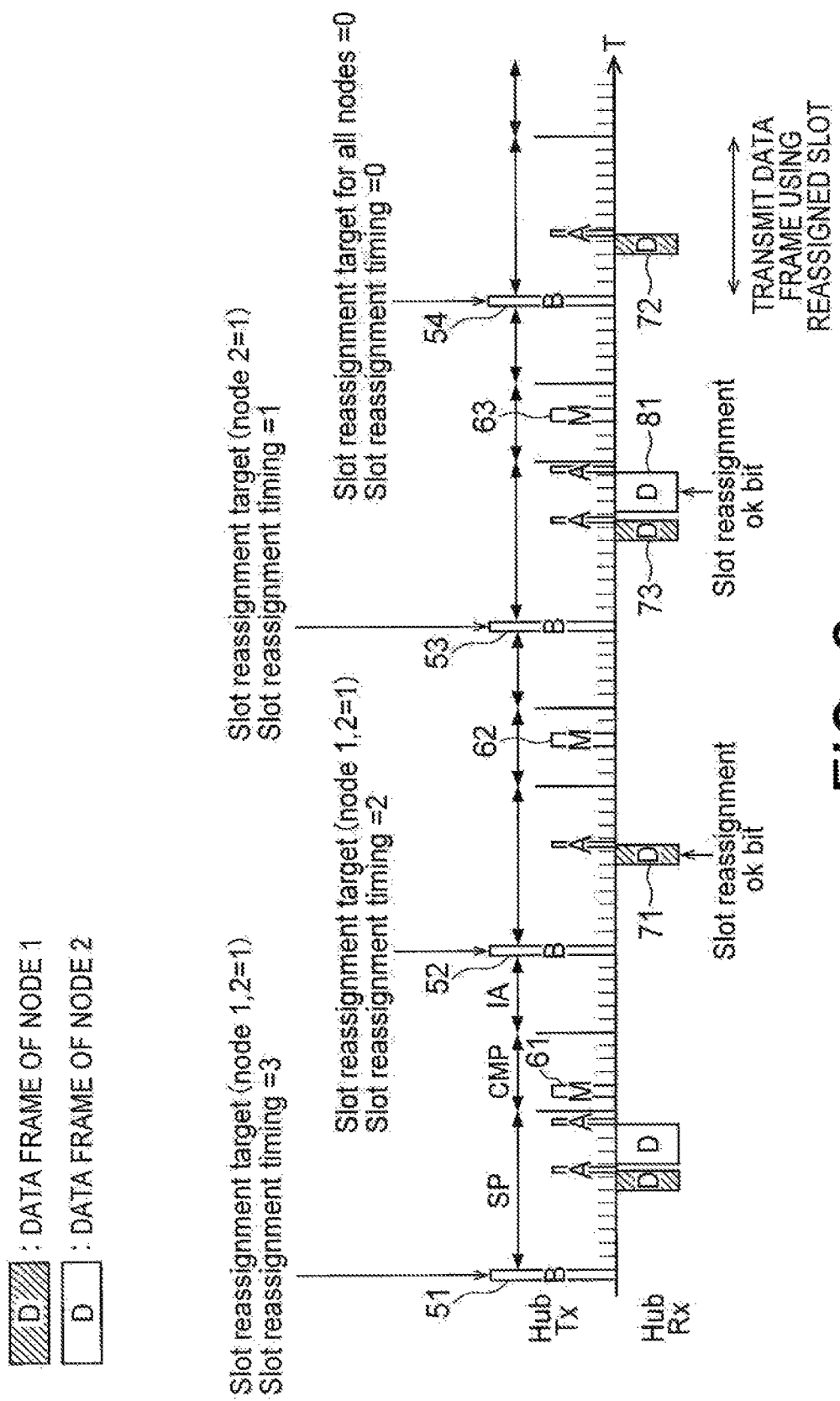
FIG. 2 is a timing diagram of a hub according to the first embodiment.

FIG. 2 illustrates a timing diagram of the hub according to the first embodiment. Timing diagrams for the nodes are the same as the timing diagram of the hub in terms of the signal transmitted and received by the nodes and the timing of the transmission and reception, except that the transmission and reception are reversed, and therefore the timing diagrams of the nodes are omitted.

The lower part of FIG. 2 illustrates signals received by a receiver of the hub from nodes (in other words, signals transmitted by transmitters of nodes to the hub) and the upper part of FIG. 2 illustrates signals transmitted from a transmitter of the hub to the nodes (in other words, signals received by the receivers of nodes from the hub). The horizontal axis is a time axis and time progresses rightward along the diagram.

Exemplary operations of the hub and the nodes will be described below with reference to FIG. 2. An exemplary operation of the hub will be described first.

The hub transmits a beacon signal, which is a beacon signal, at constant intervals and the transmitted beacon signal is received at each node. The beacon signal is a signal that carries beacon frames in a predetermined format. Each of elongated rectangles with a letter "B" in the FIG. 2 represents the beacon signal. Beacon signals in general are transmitted by broadcasting but can be transmitted by multicasting. The period or interval between successive two beacon signals is referred to as a beacon interval.

In a beacon interval, an SP (Scheduled Period), a CMP (Control & Management Period), and an IA (InActive Period) are placed. The time period of the beacon interval is divided info predetermined short lengths of time called slots and managed. This is represented by short vertical lines set along the time axis in the diagram. In the Scheduled Period, slots are assigned to the nodes in advance and communication is performed slot by slot based on the assigned slots. The Control & Management period is a period in which signals for control and management, such as a management frame and a control frame, are transmitted and received. The Inactive period is a period in which communication is not performed. In the Scheduled period, a slot-based communication scheme, i.e. TDMA scheme is used. In the Control & Management period, a contention-based access scheme such as slotted ALOHA or CSMA is used. In each of the Scheduled period and the contention-based access period, a common, identical frequency band (the same channel) is used to perform communication.

In the Control & Management period, a contention-based access scheme does not necessarily need to be used and other communication scheme, for example frequency-division multiplexing or space-division multiplexing communication by a plurality of nodes may be used. The order in which these periods are arranged in a beacon interval is not limited to the illustrated one. The periods may be arranged in any order. Furthermore, the Inactive period may be omitted from the configuration. Moreover, a configuration is possible in which the beacon interval is not divided into periods. For example, the entire beacon interval may be a slot-based TDMA period and control and management may be performed in another channel.

In the Scheduled period, slot-based communication is performed as stated above. One or more different slots are assigned to the nodes and each of the nodes communicates with the hub in the assigned slot(s). Slots may be assigned to the nodes in various manners, such as assigning a slot in every successive beacon intervals, or assigning a slot for every predetermined number of beacon intervals, or assigning a slot only in a specific beacon interval. A special-purpose slot, such as a slot for transmitting a retransmission frame in the event of a frame transmission failure, may be provided. When the hub has successfully received a data frame in a slot from a node, the hub returns an acknowledgment frame. In the diagram, a rectangle with "D" represents a data frame signal, a rectangle with "A" represents an acknowledgment frame signal, and a rectangle with "M" represents a management frame signal, in particular a notification frame signal, which will be described later.

As mentioned above, a contention-based access scheme is used in the Control & Management period. In the present embodiment, the slotted ALOHA scheme is used. In the slotted ALOHA scheme, when a node has a frame to be transmitted, a random number is generated to determine whether to transmit the frame in a certain slot. It is determined to transmit a frame with a specified probability of transmission. When it is determined to transmit, the frame is transmitted at the timing of the start of the slot. When it is determined not to transmit, transmission of the frame is canceled. The specified probability of transmission can be changed as a parameter. Note that when a plurality of nodes transmit frames at the timing of the same slot, the frames are likely to collide with each other and the transmission is highly likely to fail. Unlike TDMA scheme, which is used in the Scheduled period, slotted ALOHA scheme does not require that slots be assigned by the hub in advance.

It is assumed in the timing diagram in FIG. 2 that each of the nodes 20 to 22 has been assigned a slot in a Scheduled period. In order to receive assignment of a slot in a Scheduled period, each node transmits a connection request (C-Req) frame in a contention-based access period and receives a connection assignment (C-Ass) frame (or a connection response frame) from the hub, thereby receiving assignment of a slot. These exchanges are omitted from the diagram. Assume that, in response to some trigger, the hub determines that slots need to be reassigned to two nodes, i.e., the current slots of two nodes need to be changed (here, nodes 1 and 2). Any condition may act as a trigger for slot reassignment, such as a new connection request from another node that involves slot reassignment to nodes 1 and 2, or the need for a change to other slots due to low communication quality of the current slots assigned to nodes 1 and 2, or a slot assignment request (a request to change the slot currently being used) issued from one or both of nodes 1 and 2.

When the hub determines that slot reassignment to nodes 1 and 2 is required, the hub performs slot reassignment to nodes 1 and 2 and determines slots to be reassigned (new slots to be assigned). In addition, the hub transmits a beacon signal 51 containing slot reassignment target information specifying nodes to which slots are to be reassigned (hereinafter referred to as reassignment target nodes, here, nodes 1 and 2) and slot reassignment timing information identifying the start timing to allow use of the reassigned slots (below, use-start timing). The beacon signal 51 is a signal that conveys a beacon frame.

Figure 3:
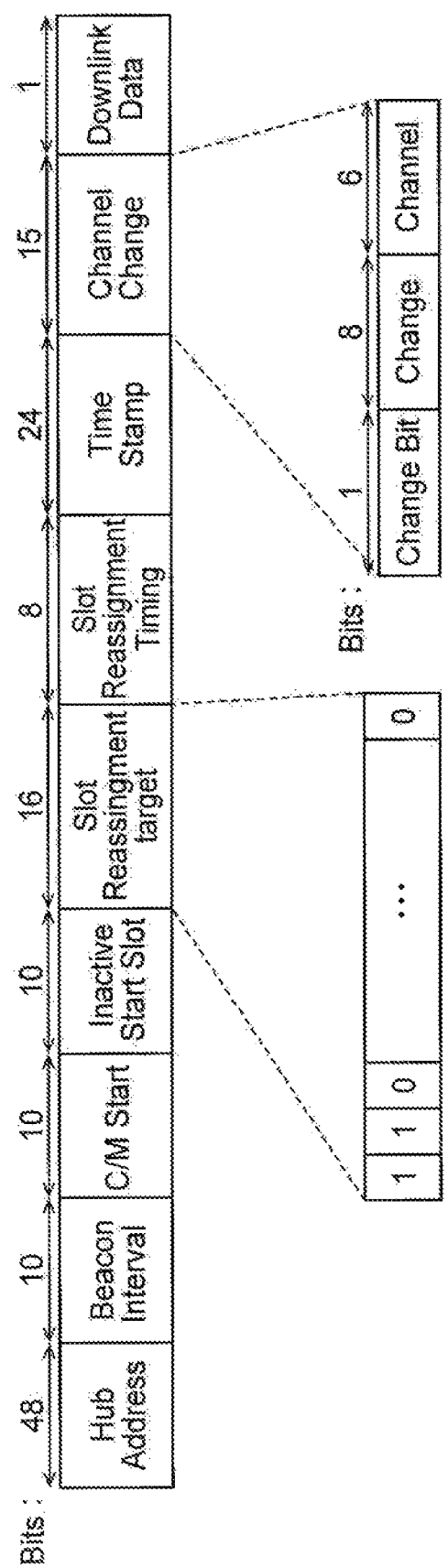
FIG. 3 is a diagram illustrating an exemplary format of a beacon frame.

FIG. 3 illustrates an exemplary format of a beacon frame according to the present embodiment. The beacon frame includes a "Slot reassignment target" field and a "Slot reassignment timing" field.

The slot reassignment target field includes a plurality of bits each of which is assigned to each of a plurality of nodes in advance. Among the bits, bits for reassignment target nodes are set to 1 and bits for the other nodes are set to 0. Assume that nodes 1, 2, ..., are assigned to the bits, starting from the first bit. Then, since nodes 1 and 2 are reassignment target nodes in this example, the first two bits are set to 1 and the other bits are set to 0. This is represented as "Slot reassignment target (node 1, 2-1)" in FIG. 2.

Information identifying a beacon interval in which the use of the reassigned slots is started (i.e. the reassigned slots are enabled) is contained in the slot reassignment timing field. For example, when the use of the reassigned slots is started in the beacon interval of the third beacon signal, counting from the beacon signal next to the beacon signal 51, "3" is set. This is represented as "Slot reassignment timing=3" in FIG. 2.

The other fields of the beacon frame will be briefly described. A "Hub Address" field is a field that contains an address of the hub, a "Beacon Interval" field is a field that contains a beacon interval length, a "C/M Start" field is a field that contains the position of the starting slot of a Control & Management period, an "Inactive Start Slot" field is a field that contains the position of the starting slot of an Inactive period, a Time Stamp field is a field that contains a value of time of day (a time stamp) kept by the hub, a "Channel Change" field is a field used when a channel is changed, and a "Downlink Data" field is a field that contains an indication of Whether the hub has data to transmit to nodes in the downlink. Note that the frame format illustrated in FIG. 3 is one example and the configuration and the like of the format may be modified.

After transmitting the beacon signal 51, the hub transmits a management frame (hereinafter referred to as a notification frame) 61 containing slot assignment information specifying new slots to be assigned (reassigned slots) to reassignment target nodes via a signal different from the beacon signal. The notification frame 61 is transmitted in a Control & Management period/in a beacon interval of the beacon signal 51. In the Case of a slotted ALOHA-based scheme, the hub randomly selects a slot in a Control & Management period and transmits a notification frame containing slot assignment information. Since nodes 1 and 2 are reassignment target nodes in this example, reassigned slots for nodes 1 and 2 are specified in the slot assignment information.

Figure 4:
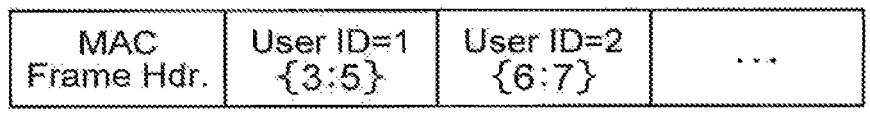
FIG. 4 is a diagram illustrating an exemplary format of a frame for providing slot assignment information.

FIG. 4 illustrates an exemplary format of the notification frame. A field is set for each node and slot assignment information specifying an identifier of the node and a reassigned slot is contained in the field. In the example in FIG. 4, fields for nodes 1 and 2 which contain slot assignment information (User ID=1, {3:5}) specifying reassigned slots 3, 4 and 5 for node 1 and slot assignment information (User ID=2, {6:7}) specifying reassigned slots 6 and 1 for node 2 are illustrated. Note that while slot assignment information is transmitted in a Control & Management period in the description given above, slot assignment information may be transmitted in another period as long as the slot assignment information is transmitted via a signal different from a beacon signal. For example, when a slot for the hub is available in a Scheduled period, slot assignment information may be transmitted in the slot.

A node to receive the notification frame containing slot assignment information is a reassignment target node specified in the reassignment target information. If there are a plurality of reassignment target nodes, a multicast address or broadcast address can be used as the destination address of the notification frame. However, if a plurality of addresses can be contained in a notification frame, a plurality of unicast addresses may be set. Alternatively, a notification frame with a unicast address may be transmitted individually to each node. In this case, only slot assignment information for a node that is the destination of the unicast may be contained in the notification frame.

On the other hand, if there is only one reassignment target node, a unicast address may be set. But a multicast address or a broadcast address can be set. However, using a unicast address is desirable because the reception processing load on nodes other than the node to receive the notification frame can be reduced.

Thereafter, the hub continues to transmit reassignment target information and reassignment timing information via a beacon signal and transmit slot assignment information in a subsequent notification frame. Each time the hub transmits a beacon signal, the hub decrements the value of the reassignment timing information by 1. For example, in a beacon signal 52 transmitted next to the beacon signal 51, the value of the reassignment timing information is 2.

Figure 5:
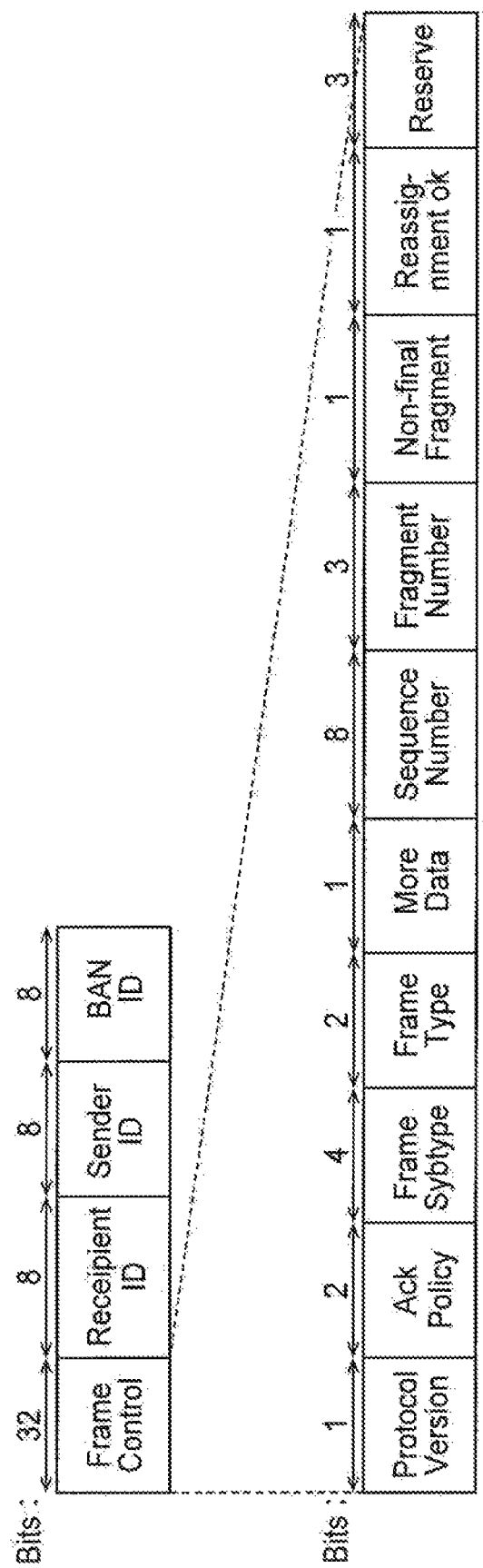
FIG. 5 is a diagram illustrating an exemplary format of a frame for providing acknowledgment information.

When the hub receives a data frame in a slot assigned to a reassignment target node from the reassignment target node in a Scheduled period, the hub checks the received data frame to see whether the data frame contains acknowledgment information indicating that the reassignment target node has received the slot assignment information. FIG. 5 illustrates an exemplary format of a data frame including a field that contains acknowledgment information. In FIG. 5, a "Reassignment ok" held is provided in the header of the data frame. When bit 1 is set in the field, the hub determines that acknowledgment information is contained; when bit 0 is set in the field, the hub determines that acknowledgment information is not contained.

When the hub determines that the data frame received from the reassignment target node contains acknowledgment information, the hub sets the bit of the node to 0 in the reassignment target information in the next and subsequent beacon signals to be transmitted. Since the node is not specified in the next and subsequent beacon signals in this way, the load of beacon reception processing on the node can be reduced. Specifically, when the node finds that its own bit is set to 0, the node can omit processing for checking the reassignment timing information field following the slot assignment information field and processing for receiving the subsequent notification frames containing slot assignment information, thereby reducing the processing load.

In the example in FIG. 2, because the hub has received a data frame 71 having the Reassignment ok field containing 1 from node 1, the hub sets the bit of node 1 in the reassignment target information from the next beacon signal 53 and subsequent beacon signals to 0. On the other hand, since the hub has not yet received acknowledgment information from node 2, the hub keeps the bit of node 2 in the reassignment target information in a beacon signal 53 at 1.

The hub receives a data frame 81 having the Reassignment ok field containing 1 from node 2 in the Scheduled period following the transmission of the beacon signal 53. This allows the hub to determine that node 2 has received the slot assignment information. Accordingly, the hub sets the bit of node 2 in the reassignment target information in the next beacon signal 54 to transmit to 0. As a result, the bits of all nodes become 0 (this is represented as "Slot reassignment target for all nodes=0" in FIG. 2). Furthermore, in the Control & Management period after the transmission of the beacon signal 53, the hub transmits a notification frame 63 containing slot assignment information as before. However, because acknowledgment information has been received from all reassignment target nodes, transmission of the notification frame 63 may be omitted.

A notification frame may contain slot assignment information for all reassignment target nodes or may contain slot assignment information for only nodes specified (with bit 1) in a beacon signal transmitted immediately before the notification frame. For example, because only node 2 is specified in the beacon signal 53, only slot assignment information for node 2 may be contained in the notification frame 63 and slot assignment information for node 1 may be omitted.

As a result of decrementing the value of reassignment timing information by 1 each time a beacon signal is transmitted as described above, the value of reassignment timing information reaches 0 in the next beacon signal 54 to transmit. In other words, the beacon interval starting at the transmission of the beacon signal 54 is at the start timing of the reassigned slot. A reassignment target node may recognize this timing by computation in the node from the value of the reassignment timing information in the first beacon signal that the node received or by checking the value of the reassignment timing information in every beacon signal received to see that the value of the reassignment timing information in the beacon signal 54 has reached 0. In the beacon interval of the beacon signal 54 and subsequent beacon signals, the reassignment target nodes use the reassigned slots specified in the slot assignment information to transmit frames to the hub. In the example in FIG. 2, node 1 uses a slot different from the slot used in the beacon interval of the beacon signal 51 to transmit a data frame 72.

An exemplary operation of the hub has been described so far. An exemplary operation of a node will be described below.

Each node receives a beacon signal transmitted from the hub at constant intervals and determines whether the node is specified as a reassignment target node in the reassignment target information in the beacon signal. If the node is specified as a reassignment target node, the node waits for a notification frame transmitted from the hub in the subsequent Control & Management period.

When the node receives a notification frame from the hub, the node identifies a reassigned slot on the basis of the slot assignment information in the notification frame. The node that has identified the reassigned slot transmits a data frame containing acknowledgment information (a reassignment ok bit set to 1) to the hub in the next Scheduled Period. With this, the node notifies the hub that the node has successfully received the slot assignment information.

In the example in FIG. 2, node 1 receives the beacon signal 51 from the hub and finds that node 1 is specified as a reassignment target node on the basis of the reassignment target information. Node 1 receives a notification frame 61 transmitted from the hub in the subsequent Control & Management period and identifies a reassigned slot from the slot assignment information in the notification frame 61. Node 1, which has identified the reassigned slot, transmits a data frame 71 containing acknowledgment information. Node 1 then uses the current assigned slot to communicate with the hub until the start timing of the reassigned slot is reached. For example, in the Scheduled Period in the frame interval of the beacon signal 53, node 1 transmits a data frame 73 in the current assigned slot. When node 1 subsequently receives the beacon signal 54 from the hub and recognizes that the start timing of the reassigned slot is reached node 1 thereafter uses the reassigned slot to communicate with the hub. In the example in FIG. 2, node 1 transmits a data frame 72 using the reassigned slot in the subsequent Scheduled Period. From then on, node 1 continues using the reassigned slot to transmit data frames.

On the other hand, node 2, like node 1, receives the beacon signal 51 and finds that node 2 is specified as a reassignment target node on the basis of the reassignment target information. Node 2 attempts to receive a notification frame in the subsequent Control & Management period but fails to receive. Alternatively, node 2 may fail to receive the beacon signal 51 and may not receive a subsequent notification frame.

The node 2 then receives the beacon signal 52 and finds that node 2 is specified as a reassignment target node on the basis of the reassignment target information contained in the beacon signal 52. Node 2 then receives a notification frame 62 transmitted from the hub in a Control & Management period. Node 2 identifies a slot reassigned to node 2 from the slot assignment information contained in the notification frame 62. Node 2, which has identified the reassigned slot, transmits a data frame 81 containing acknowledgment information. Node 2 then receives the beacon signal 54 and recognizes that the start timing of the reassigned slot is reached. From then on, node 2 uses the reassigned slot to transmit data frames to the hub.

Note that each node may enter a sleep mode when the node is not specified in the reassignment target information in a beacon signal and does not have a data frame to transmit to the hub or is not scheduled to transmit a data frame to the hub. The sleep mode represents a state in which power consumption is lower than in a normal state and may be a state in which the node cannot receive information from a network or restricts reception of information. In the sleep mode, the node may not receive beacon signals or notification frames. A node may enter the sleep mode when the node is specified in the reassignment target information in a beacon signal but the node has already transmitted acknowledgment information (preferably after the node has received ACK frame from the hub).

While each node transmits acknowledgment information via a data frame in a Scheduled Period in the exemplary operation described above, a new management frame for providing acknowledgment information may be defined and acknowledgment information may be transmitted via the management frame. In this case, the frame may be transmitted in a Scheduled Period as well as in a Control & Management period.

While the hub transmits a notification frame containing slot assignment information in a Control & Management period in the exemplary operation described above, the hub may transmit it at a downlink transmission slot for the hub if such a transmission slot is in a Scheduled Period. In this case, the hub may transmit slot assignment information either via a data frame or a management frame.

While an uplink transmission slot is assigned to a node in the exemplary operation described above, an operation similar to the exemplary operation may be performed if a slot for downlink transmission from the hub to nodes is assigned to each node.

Figure 6:
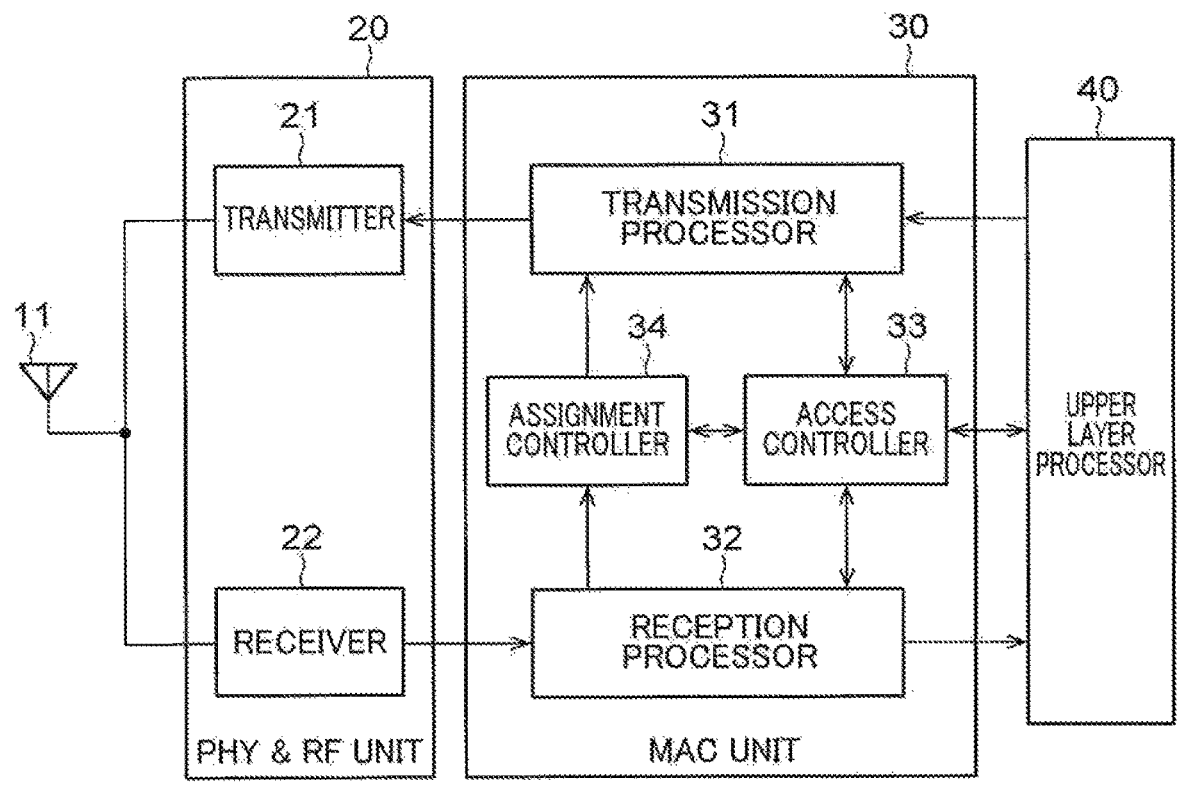
FIG. 6 is a functional block diagram of a wireless communication device provided in a hub according to the first embodiment.

FIG. 6 illustrates an exemplary configuration of a wireless communication device provided in the hub of the present embodiment. The wireless communication device includes one or more antennas 11, a PHY & RF unit 20, a MAC unit 30, which is a communication processing device according to the present invention, and an upper-layer processor 40. The PHY & RF unit 20 includes a transmitter 21 and a receiver 22. The MAC unit 30 includes a transmission processor 31, a reception processor 32, and a controller (an access controller 33, an assignment controller 34). While the assignment controller 34 is depicted as a block separate from the access controller 33 in FIG. 6, the access controller 33 may include the function of the assignment controller 34. In one example, the MAC unit 30 or a combination of the MAC unit and a part of the PHY & RF unit 20 (for example a PHY processing part) corresponds to a communication processing device according to the present embodiment. The entire PHY & RF unit 20 or a part of the PHY & RF unit 20 (for example an RF processing part) corresponds to a wireless communicator of the present embodiment.

The upper-layer processor 40 handles a protocol (such TCP/IP or UDP/IP, or the application layer) above the MAC layer. The upper-layer processor 40 passes data transmitted to the hub to the MAC unit 30 and receives data received from the hub from the MAC unit 30.

The access controller 33 performs time management of periods such as Scheduled Periods and Control & Management periods, manages access to a channel used (access such as access to slots in a Scheduled Period and access to slotted ALOHA and carrier sense in a Control & management Period) and controls transmission of management frames, data frames, and control frames. Note that management frames are frames used for management of communication links with other wireless communication devices. Management frames transmitted from the hub include a beacon frame, a notification frame, a connection response frame, and an assignment response frame. Control frames are frames used for control when a management frame and a data frame are transmitted and received (exchanged) to and from other wireless communication devices and include an ACK frame in the present embodiment. The access controller 33 instructs the transmission processor 31 to transmit a frame at desired timing. The access controller 33 may include the function of controlling switching a channel to be used.

When the access controller 33 instructs the transmission processor 31 to transmit a frame, the transmission processor 31 generates a frame and outputs the generated frame to the transmitter 21. The transmitter 21 performs desired physical layer processing on the frame input from the transmission processor 31 in accordance with a communication scheme used, performs processing such as digital-analog conversion and frequency conversion, and sends out a signal into space as a radio wave through the antenna 11.

The receiver 22 receives a signal in the channel through the antenna 11, performs reception processing in accordance with a communication scheme used, and outputs the processed frame to the reception processor 32. The reception processing includes desired physical layer processing such as frequency conversion to a base band, analog-digital conversion, analysis of a physical header of a frame after analog-digital conversion, and demodulation. The reception processor 32 performs processing such as analysis of an MAC header of a frame input from the receiver 22.

When the hub has received a connection request frame from a node, the reception processor 32 provides the connection request from the node to the access controller 33. The access controller 33 uses the assignment controller 34 to determine a response to the connection request, such as slot assignment, and provides information indicating the result of the determination to the transmission processor 31. For example, when the access controller 33 accepts the connection request, the access controller 33 determines information about slots to be assigned to the node, specifically the number of slots and the positions of the slots, and provides the determined information to the transmission processor 31. When a predetermined condition is satisfied such that slots to be assigned are short, the access controller 33 may determine to refuse connection. The transmission processor 31 generates a connection response frame in accordance with the information indicating the result of the determination by the access controller 33.

The reception processor 32 performs processing such as analysis of an MAC header of a frame input from the receiver 22 and, if the received frame is a data frame, outputs the processed frame to the upper-layer processor 40 as required. The reception processor 32 outputs an instruction to generate an ACK frame to the access controller 33 or directly to the transmission processor 31, as required. If the received frame is a management frame or a control frame, the reception processor 32 outputs the frame to the access controller 33 or the assignment controller 34. For example, when the reception processor 32 detects a slot assignment request from a node as a result of analysis of the received frame, the reception processor 32 provides a notification of the assignment request from the node to the assignment controller 34. Specifically, the reception processor 32 provides identification information of the node that has issued the assignment request and conditions for requested slots (for example, a required number of slots and a frequency (a number of times) of beacon intervals for which assignment is requested).

When a notification of a slot assignment request is provided from the reception processor 32 to the assignment controller 34, the assignment controller 34 identifies a node for which slot reassignment is required (a reassignment target node), reassigns a slot, and determines the start timing of a reassigned slot. A time point of K beacon intervals after the next beacon signal to be transmitted is chosen as the start timing (K is an integer greater than or equal to 1). The value of K may be predetermined or may be randomly determined from among random numbers within a predetermined range of values. The assignment controller 34 may reassign a slot each time the assignment controller 34 receives a Slot assignment request or may store assignment requests from nodes for a predetermined time period and may reassign slots at constant intervals (may collectively handle assignment requests from a plurality of nodes at a time). As described previously, a slot may be reassigned in response to a trigger other than the triggers described here. A slot may be reassigned when a change to another slot is required because the current slot assigned to a node has a low communication quality. Alternatively, the assignment controller 34 may reassign a slot if a slot needs to be reassigned to a node when a connection request is received from another node. For example, slot reassignment may be performed when a slot assigned to an existing node needs to be changed in order to assign a slot to a node that has issued a connection request. When the assignment controller 34 performs slot reassignment, the assignment controller 34 provides reassignment target information specifying the reassignment target node, slot assignment information specifying the slot reassigned to the reassignment target node and reassignment timing information specifying the start timing of the reassigned slot to the transmission processor 31. Information about the slots assigned to nodes may be stored in a buffer (such as a memory) in the assignment controller 34 or the access controller 33 or may be stored in another memory that is readable and writable to the assignment controller 34 or the access controller 33. These memories may be volatile memories such as DRAMs or nonvolatile memories such as NANDs and MRAMs. Alternatively, a storage medium such as a hard disk or an SSD may be used instead of memories.

When the transmission processor 31 generates a beacon frame, the transmission processor 31 inserts reassignment target information and reassignment timing information provided from the assignment controller 34 into relevant fields of the beacon frame. The transmission processor 31 transmits the beacon frame at predetermined timing (beacon signal transmission period timing) indicated by the access controller 33. In addition, the transmission processor 31 generates a notification frame containing slot assignment information provided from the assignment controller 34 and transmits the notification frame at predetermined timing indicated by the access controller 33. The access controller 33 instructs the transmission processor 31 to transmit the notification frame at timing determined according to a contention-based access scheme used in a Control & Management period immediately after transmission of a beacon signal. The assignment controller 34 decrements the value of reassignment timing information by 1 each beacon signal transmission timing and indicates the value to the transmission processor 31 until the start timing of the reassigned slot is reached.

When the reception processor 32 finds, as a result of analysis of a frame received from a node, that the frame contains acknowledgment information (for example a frame with a Slot reassignment ok bit of 1), the reception processor 32 notifies the reception of the acknowledgment information to the assignment controller 34. The assignment controller 34 delists the node from which the acknowledgment information has been received from the reassignment target information and provides the reassignment target information to the transmission processor 31.

Figure 7:
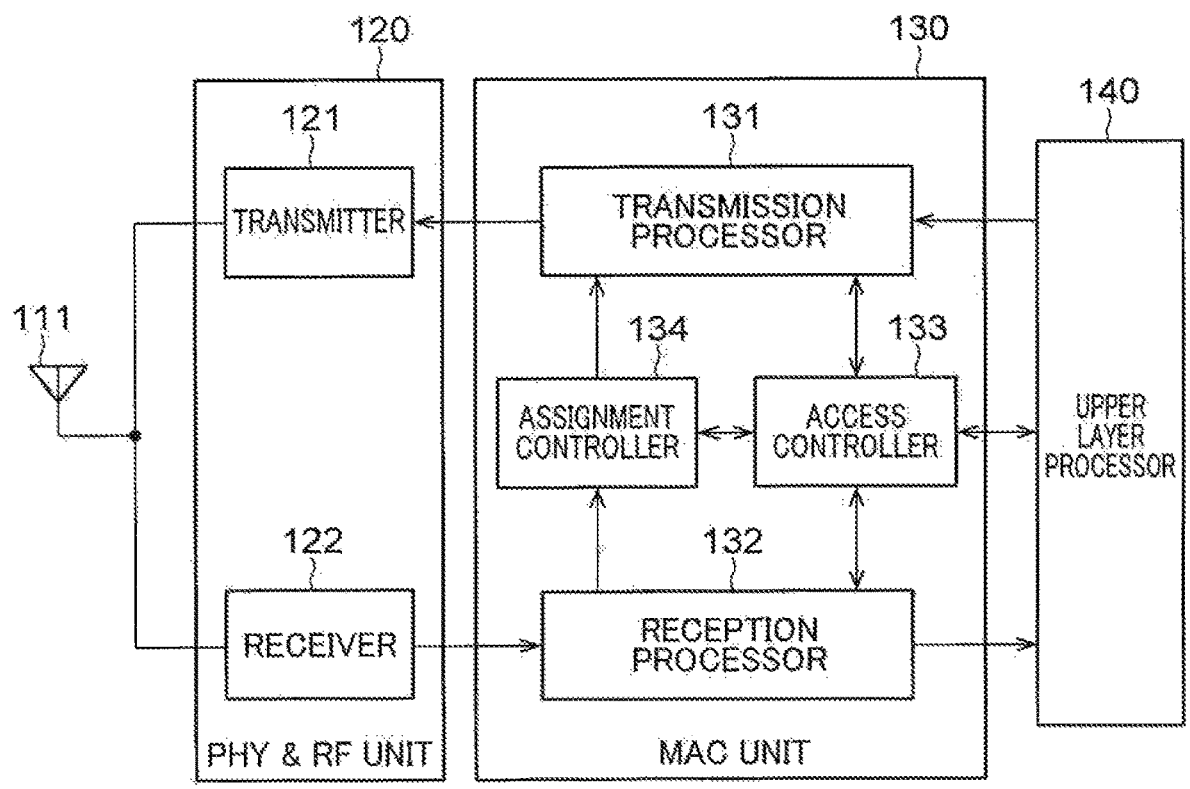
FIG. 7 is a functional block diagram of a wireless communication device provided in a node according to the first embodiment.

FIG. 7 illustrates an exemplary configuration of a wireless communication device provided in a node of the present embodiment. The wireless communication device includes one or more antennas 111, a PHY & RF unit 120, a MAC unit 130, which is a communication processing device according to the present embodiment, and an upper-layer processor 140. The PHY & RF unit 120 includes a transmitter 121 and a/receiver 122. The MAC unit 130 includes a transmission processor 131, a reception processor 132, and a controller (an access controller 133, an assignment manager 134). While the assignment manager 134 is depicted as a block separate from the access controller 133 in FIG. 7, the access controller 133 may include the function of the assignment manager 134. In an example, the MAC unit 130 or a combination of the MAC unit 130 and a part of the PHY & RF 120 (for example a PHY processor part) corresponds to a communication processing device of the present invention. The entire PHY & RF unit 120 or a part of the PHY & RF unit 120 (for example an RF processor part) corresponds to a wireless communicator of the present embodiment.

The upper-layer processor 140 handles a protocol (such as TCP/IP or UDP/IP, or the application layer) above the MAC layer. The upper-layer processor 140 passes data such as sensor data to be transmitted to the hub to the MAC unit 130 and receives data received from the hub from the MAC unit 130. Furthermore, the upper-layer processor 140 outputs a request such as a transmission request to the MAC unit 130 such as when a data transmission request is issued from an application.

The access controller 133 performs time management of periods such as Scheduled Periods and Control & Management periods, manages access to a channel used (access such as access to slots in a Scheduled Period and access to slotted ALOHA and carrier sense in a Control & Management Period) and controls transmission of frames (management frames, data frames, and control frames). Management frames transmitted from nodes in this example include connection request frames and assignment request frames. The access controller 133 instructs the transmission processor 131 to transmit a frame at desired timing. When the access controller 133 receives a transmission request from the upper-layer processor 140, the access controller 133 instructs the transmission processor 131 to transmit a connection request frame in order to connect to the hub 10 to receive assignment of a slot. Note that a channel to be used may be specified in advance or may be identified by performing channel search. The access controller 133 may include the function of controlling switching of a channel to be used.

When the access controller 133 instructs the transmission processor 131 to transmit a frame, the transmission processor 131 generates a frame and outputs the generated frame to the transmitter 121. The transmitter 121 performs desired physical layer processing on the frame input from the transmission processor 131 in accordance with a communication scheme used, performs processing such as digital-analog conversion and frequency conversion, and sends out a signal into space as a radio wave through the antenna 111.

The receiver 122 receives a signal in a relevant channel through the antenna 111, performs reception processing in accordance with a communication scheme used, and outputs the processed frame to the reception processor 132. The reception processing includes desired physical layer processing such as frequency conversion to a base band, analog-digital conversion, analysis of a physical header of a frame after analog-digital conversion, and demodulation. The reception processor 132 performs processing such as analysis of an MAC header of a frame input from the receiver 122.

When the reception processor 132 receives from the hub a connection response frame to a connection request, the reception processor 132 provides the connection response from the hub to the access controller 133. When the access controller 133 finds from the connection response that a slot has been assigned, the access controller 133 performs control so that thereafter the slot is used to perform communication in a Scheduled Period. Note, that if the connection request is refused (because of shortage of slots that can be assigned or other reasons), the access controller 133 may perform control to retransmit the connection request after a predetermined time period has elapsed.

The reception processor 132 performs processing such as analysis of an MAC header of a frame input from the receiver 122 and, if the received frame is a data frame, outputs the processed frame to the upper-layer processor 140 as required. The reception processor 132 outputs an instruction to generate an ACK frame to the access controller 133 or directly to the transmission processor 131, as required. If the received frame is a management frame or a control frame, the reception processor 132 outputs the frame to the access controller 133 or the assignment manager 134. For example, when the reception processor 132 detects reassignment target information in which the own node is specified and reassignment timing information as a result of analysis of the received frame, the reception processor 132 outputs the information to the assignment manager 134. In addition, when the reception processor 132 detects slot assignment information for the own node, the reception processor 132 outputs the slot assignment information to the assignment manager 134.

When reassignment target information and reassignment timing information are provided from the reception processor 132 to the assignment manager 134, the assignment manager 134 performs management to detect whether the start timing of a slot indicated by the reassignment timing information is reached. For example, the assignment manager 134 may detect that the start timing is reached on the basis of an internal timer or may detect the start timing by receiving notification of reassignment timing information from the reception processor 132 at each reception of a beacon signal and comparing it with the value of the provided information. Furthermore, when slot assignment information is provided to the assignment manager 134, the assignment manager 134 identifies the slot reassigned to the own node and indicates the reassigned slot to the access controller 133 so as to start to use the reassigned slot when the start timing of the slot is reached. In addition, the assignment manager 134 outputs acknowledgment information indicating that the slot assignment information has been received to the transmission processor 131 and the access controller 133 instructs the transmission processor 131 to transmit a data frame containing the acknowledgment information by using a slot assigned in a Scheduled Period (a slot before the reassignment). Note that processing for outputting acknowledgment information to the transmission processor 131 may be performed by the access controller 133 in place of the assignment manager 134. Information about the slot assigned to the own node may be stored in a buffer (memory) in the assignment manager 134 or the access controller 133, or may be stored in another memory readable and writable to the assignment manager 134 or the access controller 133. These memories may be volatile memories such as DRAMs or nonvolatile memories such as NANDs and MRAMs. Alternatively, a storage medium such as a hard disk or an SSD may be used instead of memories.

The assignment manager 134 or the recess controller 133 may perform control so that a slot assignment request is transmitted in accordance with the amount of data to transmit. For example, when the amount of data or the frequency of transmissions increases, an assignment request may be transmitted to request to increase the number of slots; whereas when the amount of data or the frequency of transmissions decreases, an assignment request may be transmitted to request to decrease the number of slots. Increase or decrease in the amount of data may be indicated from the upper-layer processor 140 or may be determined on the basis of the amount of data in a buffer for storing data to be transmitted by monitoring the buffer. Increase or decrease in the frequency of transmissions may be indicated from the upper-layer processor 140 or, if a data category is set for data to be transmitted (for example whether the data is emergency data or not), increase or decrease in the frequency of transmissions may be determined on the basis of the data category.

If the own node is a reassignment target node and does not have data to transmit to the hub or is not scheduled to transmit data to the hub after acknowledgment information for slot assignment information is transmitted (after an ACK frame is received from the hub), the access controller 133 or a controller specially provided may cause the node to enter a sleep mode. As described previously, the sleep mode represents a state in which power consumption is lower than in a normal state and may be a state in which the node cannot receive signals such as a beacon signal and a notification frame from a network or restricts reception of signals, for example. The node may be caused to enter the low power consumption state by removing power supply to some of the components of the device or to some circuits of some of the components. Alternatively, the operating frequency of the node may be lowered.

Figure 8:
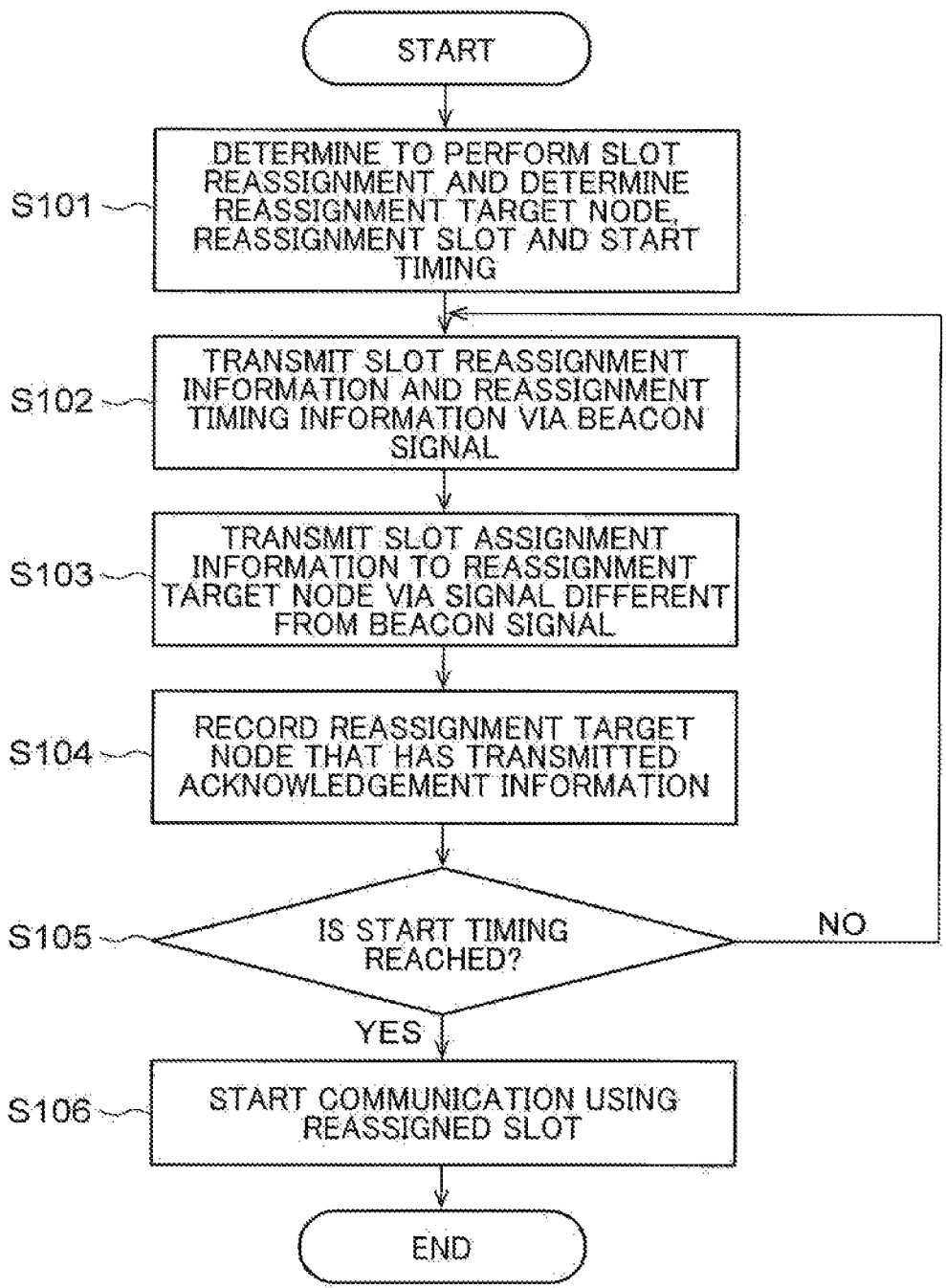
FIG. 8 is a flowchart illustrating an exemplary operation of a hub according to the first embodiment.

FIG. 8 illustrates a flowchart of a basic operation of the hub according to the present embodiment. The hub transmits a beacon signal at constant intervals.

When the hub determines to perform slot reassignment (change of slots) because a given condition is satisfied, the hub determines a reassignment target node, a slot to be reassigned to the reassignment target node, and the timing of the start of use (the start timing) of the reassigned slot (S101). As stated previously, a time point of K beacon intervals after the next beacon signal to be transmitted is chosen as the start timing (K is an integer greater than or equal to 1).

The hub transmits reassignment target information in which the reassignment target node is specified and reassignment timing information in which the start timing is specified via a beacon signal (S102). The value of the reassignment timing information is, for example, the number of remaining beacon signal transmissions (the number of beacon intervals) before the start timing is reached.

After transmitting the beacon signal containing the reassignment target information and the reassignment liming information, the hub sets slot assignment information specifying a reassigned slot in a notification frame and transmits a signal including the notification frame, which is a signal different from a beacon signal (S103). For example, the notification frame is transmitted in a Control & Management period.

When the hub receives acknowledgment information in response to the slot assignment information from the reassignment target node, the hub records the reassignment target node that has returned the acknowledgment information (S104). When the next beacon transmission timing is reached (NO at S105), the hub transmits reassignment target information in which a reassignment target node other than the node that has returned the acknowledgment information is specified and reassignment timing information indicating the number of remaining beacon transmissions minus 1 via a beacon signal (S102).

When the hub detects that the start timing is reached (YES at S105), the hub switches the slot of the reassignment target node to the reassigned slot and thereafter uses the reassigned slot to communicate with the reassignment target node (S106).

Figure 9:
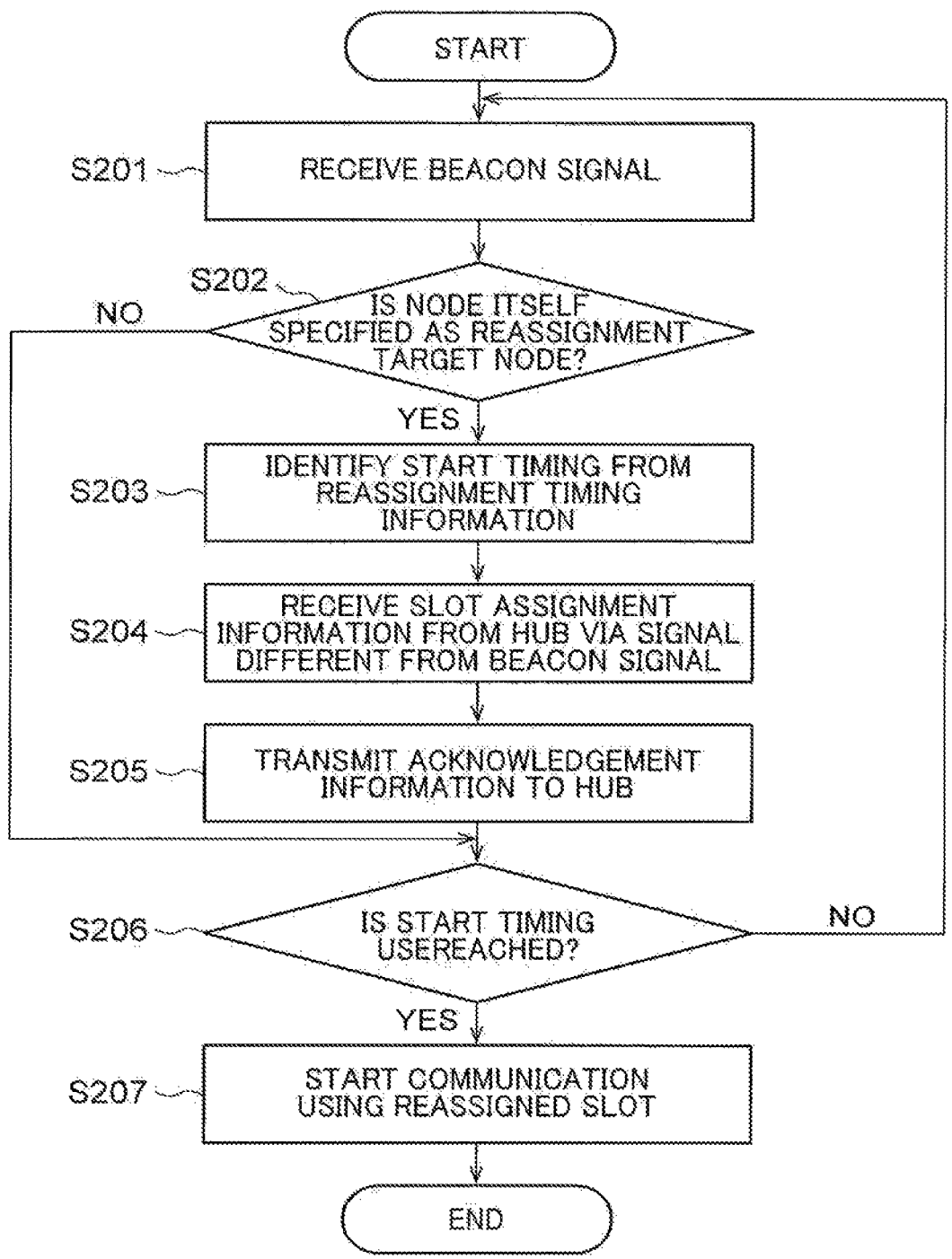
FIG. 9 is a flowchart illustrating an exemplary operation of a node according to the first embodiment.

FIG. 9 illustrates a flowchart of a basic operation of a node according to the present embodiment.

The node receives a beacon signal transmitted from the hub at constant intervals (S201) and determines from reassignment target information contained in the beacon signal whether the node is specified as a reassignment target node (S202). If the node is specified as a reassignment target node (YES at S202), the node identifies, from reassignment timing information contained in the beacon signal, the start timing of the reassigned slot (S203). The node starts to manage the identified start timing so that the node can detect when the start timing is reached. For example, the node uses an internal timer to count time intervals until the start timing is reached or counts the number of beacon signal receptions after the identification, so that the node can detect that the start timing is reached. Alternatively, the node may check the reassignment timing information contained in every beacon signal to detect that the start timing is reached.

When the node finds that the node is specified as a reassignment target node, the node receives a notification frame containing slot assignment information in a Control & Management period via a signal different from a beacon signal (S204) and transmits acknowledgment information indicating that the node has received the slot assignment information to the hub (S205). The acknowledgment information is transmitted in a data frame using the current assigned slot, for example.

When the node detects that the start timing is reached (YES at S206), the node switches from the current assigned slot to the reassigned slot specified in the slot assignment information and thereafter uses the reassigned slot to perform communication (S207). When the start timing is not yet reached, processing at steps S203 through S205 does not need to be performed because the node is hot specified in the beacon signal received from the hub (Step S201, NO at S202). Note that in a configuration in which the node checks the reassignment timing information contained in each beacon signal to detect that the start timing is reached, processing at step S203 may be omitted.

In the embodiment described above, an example is given in which the start timing of a reassigned slot is indicated by the number of remaining beacon intervals (or the number of remaining beacon signal transmissions) and the value of the reassignment timing information is counted down each time a beacon signal is transmitted. Another exemplary method that can be used for indicating the start timing is to use a sequence number (SN) of a beacon frame.

For example, it is common practice to attach a number, ranging from 0 through 255 or so, called sequence number (SN) to each beacon frame. For example, the hub uses and sets the sequence number of a beacon frame to be transmitted immediately before the start timing as the value of reassignment timing information. A node that has received the beacon frame identifies the sequence number indicated by the reassignment timing information contained in the beacon frame. Based on the identified sequence number, the node determines the time that elapses before the start timing. Alternatively, based on the difference between the identified sequence number and the current sequence number, the node calculates the number of remaining beacon signal receptions (the number of remaining beacon intervals). Alternatively, the node may compare the identified sequence number with the sequence number of a subsequently received beacon frame and, when the sequence numbers match, the node may determine that the start timing is reached. Unlike the method that indicates the number of remaining beacon intervals, this method does not require decrementing a value each time a beacon signal is transmitted. Accordingly, this method has an advantage in that the processing by the hub is simplified.

In the embodiment described above, the hub transmits slot assignment information in each beacon interval (more specifically, in each Control & Management period) until just before the start timing. In another method, once the hub has received acknowledgment information for slot assignment information from all of the reassignment target nodes, the hub can stop transmitting slot assignment information. This can omit unnecessary frame transmission and reception to reduce power consumption in the hub and nodes While the start timing specified in reassignment timing information is a value common to a plurality of reassignment target nodes, in the embodiment described above, different start timings may be set for individual reassignment target nodes. This provides a more flexible mechanism.

While reassignment timing information is contained in a beacon signal and transmitted in the embodiment described above, reassignment timing information may be contained in the same notification frame that contain slot assignment information and transmitted, instead of containing the reassignment timing information in the beacon signal. This can reduce the length of the beacon signal and accordingly the power consumption in processing for nodes other than the reassignment target nodes to receive the beacon signals.

According to the first embodiment described above, reassignment target information in which only reassignment target nodes are specified and reassignment timing information are transmitted via a beacon signal and slot assignment information in which reassigned slots for the reassignment target nodes are specified is provided via a signal different from the beacon signal. Accordingly, the amount of information contained in the beacon signal can be minimized. In addition, power consumption in nodes other than the reassignment target nodes can be reduced because the nodes other than the reassignment target nodes can avoid or restrict processing for receiving slot assignment information (for example, when a node detects that a frame contains slot assignment information from the frame header, the node can stop processing for receiving the frame) or enter a sleep mode.

Furthermore, because reassignment information is contained in each beacon signal, a node that has failed to receive a beacon signal can correctly identify the start timing by successfully receiving subsequent, another beacon signal.

Furthermore, because a reassignment target node provides acknowledgment information to the hub when the node has successfully received slot assignment information, the hub can subsequently remove the node that has transmitted the acknowledgment information from specifying targets in reassignment target information. Consequently, the nodes that are not specified in the reassignment target information can avoid performing operation for receiving a notification frame that contains slot assignment information or can operate so as to suppress processing for receiving such a notification frame, thereby reducing power consumption.

Second Embodiment

In a second embodiment, processing will be described which is performed when acknowledgment information (a Reassignment ok bit) has net been received from at least one of reassignment target nodes before the start timing is reached. The basic flow of the other parts of the process is the same as in the first embodiment and therefore the description of which will be omitted.

Figure 10:
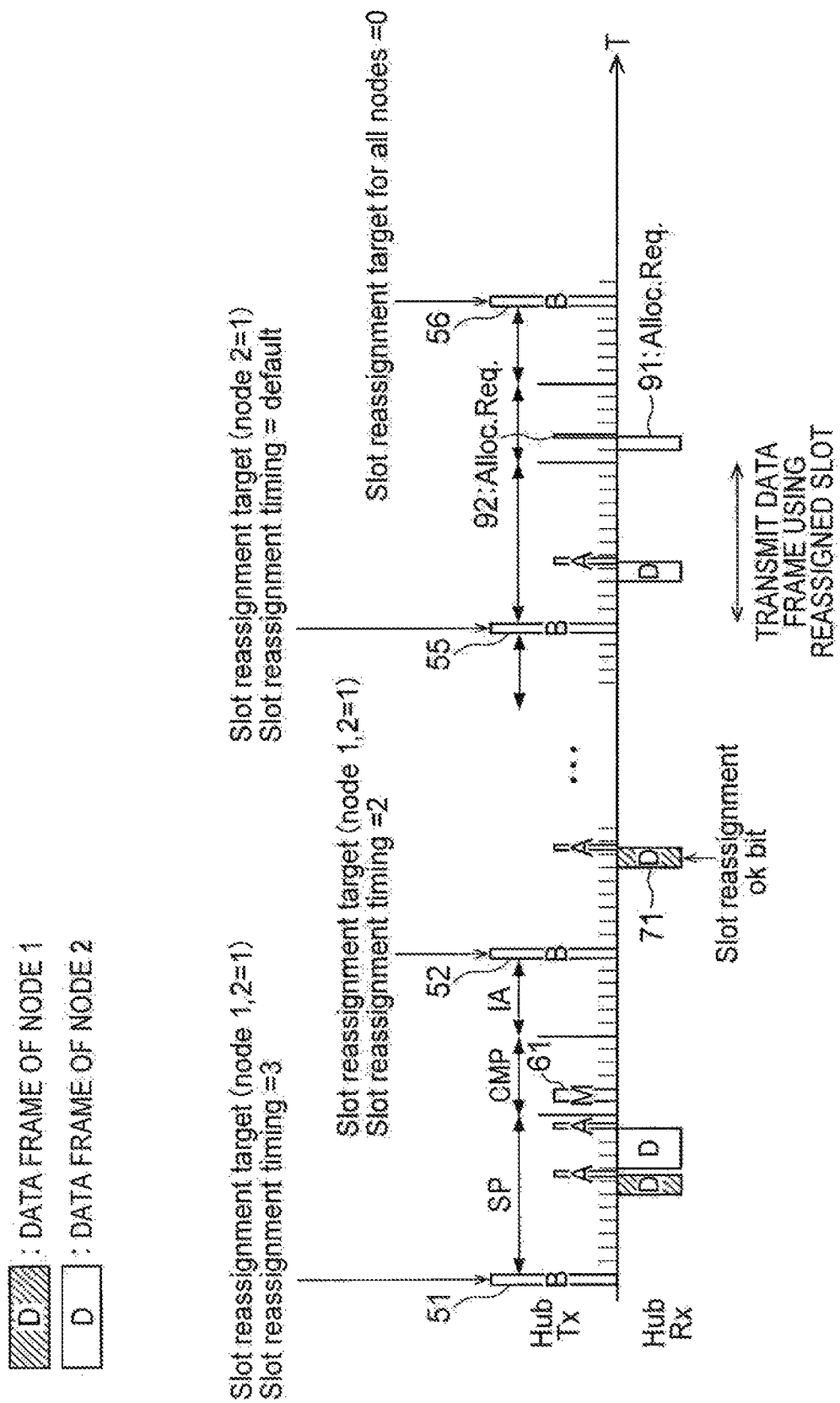
FIG. 10 is a timing diagram of a hub according to a second embodiment.

FIG. 10 illustrates a timing diagram of a hub according to the present embodiment. As in the first embodiment, it is assumed that node 1 and node 2 are reassignment target nodes. The process is the same as the process in the first embodiment until node 1 transmits a data frame 71 containing acknowledgment information.

In the first embodiment, then node 2 receives a notification frame containing slot assignment information and transmits a data frame containing acknowledgment information. It is assumed in the second embodiment that the start timing is reached without node 2 receiving a notification frame containing slot assignment information. Note that possible reasons that node 2 does not receive a notification frame may be that node 2 has successively failed to receive a beacon signal because its reception condition gets worse or node 2 is in a sleep mode or that node 2 has received a beacon signal but failed to receive a notification frame.

In such a case, the hub transmits a beacon signal 55 containing reassignment target information that specifies node 2. In the first embodiment, the hub has received acknowledgment information from all of the reassignment target nodes by the time when the hub transmits a beacon signal functioning as the start timing. Accordingly, no nodes are specified in reassignment target information in that beacon signal. In the second embodiment, in contrast, acknowledgment information from node 2 is not received by the start timing. The hub therefore still specifies node 2 in the reassignment/target information in the beacon signal. Specifically, the hub turns on the bit (sets the value of the bit to 1) at the bit position corresponding to node 2 in a slot reassignment target field in the beacon signal and sets the values of bits that correspond to the other nodes to 0. In addition, the hub sets the value of reassignment timing information in the beacon signal to a default value (a predetermined value) predetermined in the system. By setting the value of the reassignment timing information to the default value, the hub notifies node 2 that the start timing is reached. The default value means that the use of the slot currently assigned to node 2 is prohibited. In other words, the assigned slot is invalidated.

The default value may be any value that is predetermined in the system or specified by specification. The default value may be set differently depending on cases such as where the reassignment timing is indicated by the sequence number of a beacon signal or where the reassignment timing is indicated by the number of remaining beacon intervals.

If the start timing is indicated by the sequence number of a beacon signal and the slot reassignment timing field of the beacon signal is an 8-bit field, a possible value is in the range of 0 through 255. Accordingly, for example, values in the range of 0 through 254 are treated as the sequence numbers of beacon signals and the default value is set to 255. Alternatively, for example, values in the range of 1 through 255 are treated as the sequence numbers and the default value may be set to 0. In other words, the maximum or minimum value in the range of possible values in a bit length may be set as the default value.

On the other hand, if the start timing is indicated by the number of remaining beacon intervals and the slot reassignment timing field is in 8-bit field, the default value may be set to 0 or 255.

When node 2 receives the beacon signal 55, node 2 recognizes on the basis of the reassignment target information that node 2 is a reassignment target node and determines from the value (default value) of the reassignment timing information that the start timing is reached and the currently assigned slot can no longer be used. Because the hub no longer transmits a notification frame containing slot assignment information, node 2 transmits a slot Allocation Request frame 91 in a Control & Management period and receives an Allocation Response frame 92. From the Allocation Response frame 92, node 2 identifies a new slot assigned by the hub. From then on, node 2 uses the identified slot to communicate in a Scheduled Period. Because the slot reassignment to all of the reassignment target nodes completes, the hub transmits the next beacon signal 56 and the subsequent beacon signals that contain reassignment target information in which no nodes are specified (the bits of all nodes are 0) and reassignment timing information that is set to a given value such as a default value.

In the embodiment described above, the value of reassignment timing information is set to a default value to indicate that the use of the current assigned slot of a node specified in reassignment target information is prohibited. Alternatively, a field for indicating that the use of the slot currently assigned to the node is prohibited is provided in a beacon frame and information indicating the prohibition is set in the field to indicate that the use of the slot is prohibited.

According to the present embodiment, when there is a reassignment target node that does not return an acknowledgment by the start timing of a reassigned slot, information indicating that the use of the slot currently assigned to the reassignment target node is prohibited is notified to the node via a beacon signal. This enables to prevent the problem of collision due to transmission by the reassignment target node by using a slot assigned to another node after the start timing of the slot is reached.

Third Embodiment

Figure 11:
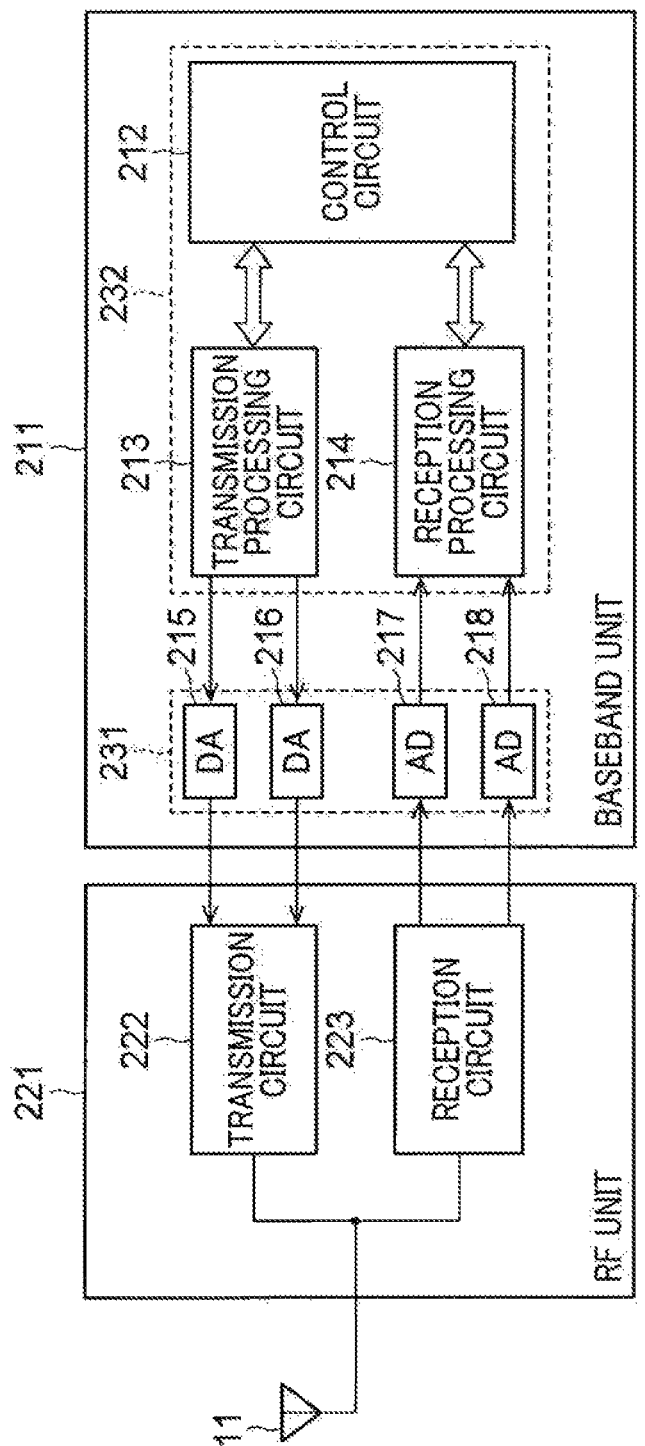
FIG. 11 is a diagram illustrating an exemplary hardware configuration of a wireless communication device provided in a hub according to a third embodiment.

FIG. 11 illustrates an example of a hardware configuration of a wireless communication device of a hub in accordance with the present embodiment. This hardware configuration is only provided by way of example, and various modifications can be made to this hardware configuration. The operation of the wireless communication device illustrated in FIG. 11 proceeds in the same or similar manner as in the wireless communication device of the hub described by way of FIG. 6 in the previous embodiment, and therefore detailed description thereof is omitted. The following explanation focuses on the differences in respect of the hardware configuration.

This wireless communication device includes a baseband unit 211, an RF unit 221, and at least one antenna 11.

The baseband unit 211 includes a control circuit 212, a transmission processing circuit 213, a reception processing circuit 214, DA conversion circuits 215, 216, and AD conversion circuits 217, 218. The RF unit 221 and the baseband unit 211 may be collectively configured as one-chip IC (integrated circuit) or may be configured as independent chips.

As one example, the baseband unit 211 is a baseband LSI or a baseband IC. Alternatively, the baseband unit 211 may include an IC 232 and an IC 231 in the illustrated manner as indicated by dotted lines. In this context, components may be incorporated in a distributed manner on these ICs such that the IC 232 includes the control circuit 212, the transmission processing circuit 213, and the reception processing circuit 214 while the IC 231 includes the DA conversion circuits 215, 216 and the AD conversion circuits 217, 218.

The control circuit 212 is mainly configured to execute the functionality of controllers (the access controller 33, assignment controller 34), the transmission processor 31 and the reception processor 32 of FIG. 6. The functionality of the upper layer processor 40 may be included in the control circuit 212. The control circuit 212 corresponds, as one example, to a communication controlling device for controlling communication, or a controller for controlling communication. At this point, the wireless communicator may include the transmission processing circuit 213 and the reception processing circuit 214. The wireless communicator may further include the DA conversion circuits 215 and 216, and the AD conversion circuits 217 and 218, in addition to the transmission processing circuit 213 and the reception processing circuit 214. The wireless communicator may even further include a transmission circuit 222 and a reception circuit 223, in addition to the transmission processing circuit 213, the reception processing circuit 214, the DA conversion circuits 215 and 216, and the AD conversion circuits 217 and 218. The integrated circuit according to the present embodiment may include a processor that performs all or a part of the process of the baseband unit 211, that is, all or a part of the processes of the control circuit 212, the transmission processing circuit 213, the reception processing circuit 214, the DA conversion circuits 215 and 216, and the AD conversion circuits 217 and 218.

Alternatively, the IC 232, may correspond to the communication controlling device for controlling communication. At this point, the wireless communicator may include the transmission circuit 222 and the reception circuit 223. The wireless communicator may further include, in addition to the transmission circuit 222 and the reception circuit 223, the DA conversion circuits 215 and 216, and the AD conversion circuits 217 and 218.

The transmission processing circuit 213 corresponds to the section that performs the processing before DA conversion processing in the transmitter 21 of the PHY&RF unit 20 in FIG. 6. Specifically, the transmission processing circuit 213 mainly performs processing associated with the physical layer including addition of a preamble and a PHY header, encoding, modulation, and generates, for example, two types of digital baseband signals (hereinafter referred to as the digital I-signal and Q-signal). In the case of the MIMO transmission, the two kind of digital baseband signals are created for each stream.

The communication processing device of this embodiment corresponds, for example, to the control circuit 212, the transmission processing circuit 213, and the reception processing circuit 214. The communication processing device of this embodiment may take either configuration of a one-chip IC configuration, or a multiple chip IC configuration.

The DA conversion circuits 215 and 216 correspond to the section associated with the digital-to-analog conversion in the transmitter 21 of the PHY&RF unit 20 in FIG. 6. The DA conversion circuits 215 and 216 are configured to perform digital-to-analog conversion for the signals input from the transmission processing circuit 213. More specifically, the DA conversion circuit 215 converts a digital I-signal into an analog I-signal, and the DA conversion circuit 216 converts a digital Q-signal into an analog Q-signal. It should be noted that there may be a case where the signals are transmitted as single-channel signals without the quadrature modulation being performed. In this case, it suffices that one single DA conversion circuit is provided. In addition, when transmission signals of one single channel or multiple channels are transmitted in a distributed manner in accordance with the number of antennas, DA conversion circuits may be provided in the number corresponding to the number of the antennas.

The RF unit 221, by way of example, is an RF analog IC or a high-frequency wave IC. The transmitting circuit 222 in the RF unit 221 corresponds to the section associated with the processing following the digital-to-analog conversion out of the functions of the transmitter 21 of the PHY&RF unit 20 illustrated in FIG. 6. The transmitting circuit 222 includes a transmission filter that extracts a signal of a desired bandwidth from the signal of the frame that has been subjected to the digital-to-analog conversion by the DA conversion circuits 215 and 216, a mixer that performs up-conversion for the signal that has been subjected to the filtering to the wireless frequency using a signal having a predetermined frequency supplied from an oscillation device, a pre-amplifier (PA) that performs amplification for the signal that has been subjected to the up-conversion, and the like.

The receiving circuit 223 in the RF unit 221 corresponds to the section associated with the processing prior to the analog-to-digital conversion from among the functions of the receiver 22 of the PHY&RF unit 20 illustrated in FIG. 6. The receiving circuit 223 includes an LNA (low noise amplifier) that amplifies the signal received by the antenna, a mixer that performs down-conversion of the amplified signal to the baseband using a signal having a predetermined frequency supplied from an oscillation device, a reception filter that extracts a signal of a desired bandwidth from the signal that has been subjected to the down-conversion, and the like. More specifically, the receiving circuit 223 performs quadrature demodulation for the reception signal, which has been subjected to the low noise amplification by a low noise amplifier, by carrier waves with 90 degree phase shift with respect to each other and thus generates an I-signal (In-phase signal) having the same phase as that of the reception signal and a Q-signal (Quad-phase signal) whose phase is delayed by 90 degrees with respect to the reception signal. The I-signal and the Q-signal are output from receiving circuit 223 after being subjected to the gain adjustment.

The control circuit 212 may control the operation of the transmission filter of the transmitting circuit 222 and the reception filter of the receiving circuit 223. Another controller that controls the transmitting circuit 222 and the receiving circuit 223 may be provided and the same or similar control may be realized by the control circuit 212 sending instructions to that controller.

The AD conversion circuits 217, 218 in the baseband unit 211 correspond to the section that performs the analog-to-digital conversion in the receiver 22 as illustrated in FIG. 6. The AD conversion circuits 217, 218 perform analog-to-digital conversion for the input signal that is input from the receiving circuit 223. More specifically, the AD conversion circuit 217 converts the I-signal into a digital I-signal and the AD conversion circuit 218 converts the Q-signal into a digital Q-signal. It should be noted that quadrature demodulation may not be performed and only a single-channel signal may be received. In this case, only one AD conversion circuit has to be provided. In addition, when a plurality of antennas are provided, AD conversion circuits in the number corresponding to the number of the antennas may be provided. The reception processing circuit 214 correspond to the section that performs the reception processing of the physical layer in the receiver 22 as illustrated in FIG. 6. Specifically, the reception processing circuit 214 performs demodulation processing, decoding processing, and analyzing processing on the preamble and the PHY header and the like. Incidentally, the function of the transmission processor 31 may be included in the transmission processing circuit 213, the function of the reception processor 32 may be included in the reception processing circuit 214, and the functions of the access controller and the assignment controller 34 may be included in the control circuit 212.

It should be noted that a switch may be arranged in the RF unit for switching the antenna 11 between the transmitting circuit 222 and the receiving circuit 223. By controlling the switch, the antenna 11 may be connected to the transmitting circuit 222 at the time of transmission and the antenna 11 may be connected to the receiving circuit 223 at the time of reception.

Although the DA conversion circuits 215, 216 and the AD conversion circuits 217, 218 are arranged on the side of the baseband unit 211 in FIG. 11, another configuration may be adopted where they are arranged on the side of the RF unit 221.

It should be noted that the wireless communicator may be formed by the transmitting circuit 222 and the receiving circuit 223. The wireless communicator may be formed by further adding DA conversion circuits 215, 216 and the DA conversion circuits 217, 218 to the transmitting circuit 222 and the receiving circuit 223. The wireless communicator may be formed by including, along with these components, the PHY processing portions (i.e., the modulator and the demodulator) of the transmission processing circuit 213 and the reception processing circuit 214.

Figure 12:
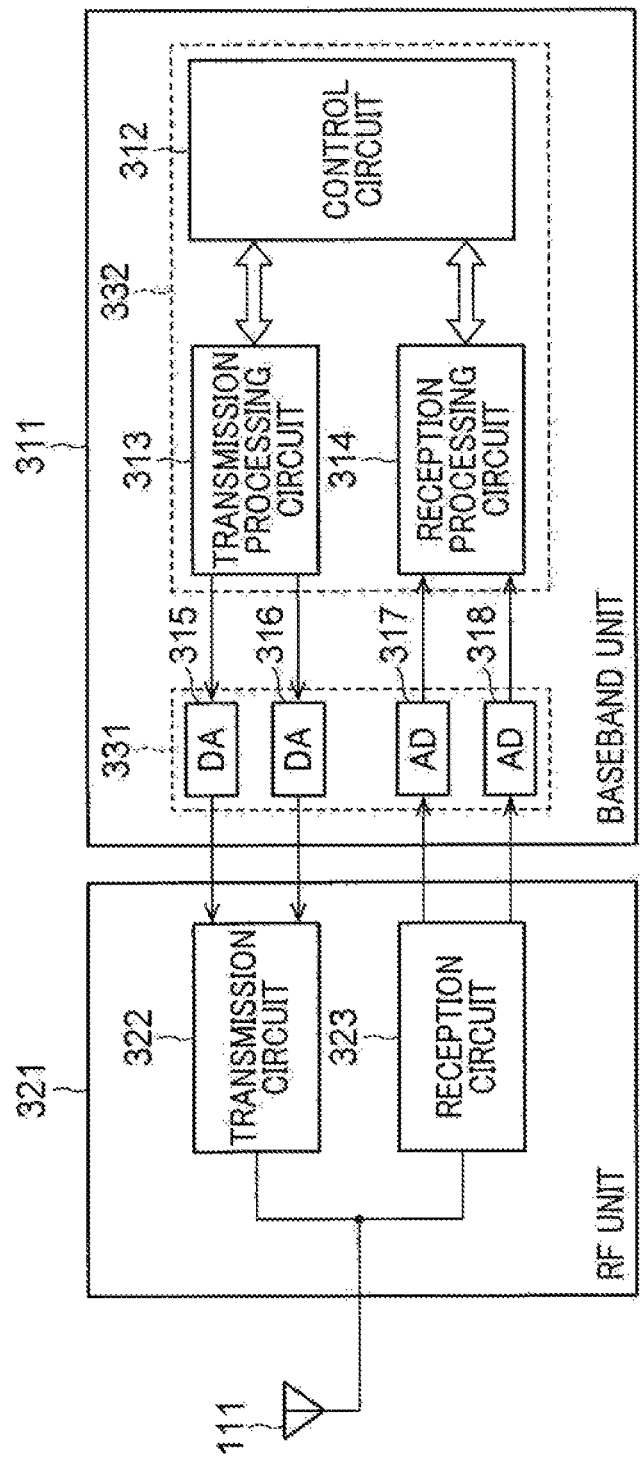
FIG. 12 is a diagram illustrating an exemplary hardware configuration of a wireless communication device provided in a node according to the third embodiment.

FIG. 12 illustrates an example of a hardware configuration of a wireless communication device of a node in accordance with the present embodiment. This hardware configuration is only provided by way of example, and various modifications can be made to this hardware configuration. The operation of the wireless communication device illustrated in FIG. 12 proceeds in the same or similar manner as in the wireless communication device of the hub described by way of FIG. 7 in the previous embodiment, and therefore detailed description thereof is omitted. The following explanation focuses on the differences in respect of the hardware configuration.

This wireless communication device includes a baseband unit 311, an RF unit 231, and at least one antenna 111.

The baseband unit 311 includes a control circuit 312, a transmission processing circuit 313, a reception processing circuit 314, DA conversion circuits 315, 316, and AD conversion circuits 317, 318. The RF unit 321 and the baseband unit 311 may be collectively configured as one-chip IC (integrated circuit) or may be configured as independent chips.

As one example, the baseband unit 311 is a baseband LSI or a baseband IC. Alternatively, the baseband unit 311 may include an IC 332 and an IC 331 in the illustrated manner as indicated by dotted lines. In this context, components may be incorporated in a distributed manner on these ICs such that the IC 232 includes the control circuit 312, the transmission processing circuit 313, and the reception processing circuit 314 while the IC 331 includes the DA conversion circuits 315, 316 and the AD conversion circuits 317, 318.

The control circuit 312 is mainly configured to execute the functionality of controllers (the access controller 133, assignment controller 134), the transmission processor 311 and the reception processor 132 of FIG. 6. The functionality of the upper layer processor 140 may be included in the control circuit 312. The control circuit 312 corresponds, as one example, to a communication controlling device for controlling communication, or a controller for controlling communication. At this point, the wireless communicator may include the transmission processing circuit 313 and the reception processing circuit 314. The wireless communicator may further include the DA conversion circuits 315 and 316, and the AD conversion circuits 317 and 318, in addition to the transmission processing circuit 313 and the reception processing circuit 314. The wireless communicator may even further include a transmission circuit 322 and a reception circuit 323, in addition to the transmission processing circuit 313, the reception processing circuit 314, the DA conversion circuits 315 and 316, and the AD conversion circuits 317 and 318. The integrated circuit according to the present embodiment may include a processor that performs all or a part of the process of the baseband unit 311, that is, all or a part of the processes of the control circuit 312, the transmission processing circuit 313, the reception processing circuit 314, the DA conversion circuits 315 and 316, and the AD conversion circuits 317 and 318.

Alternatively, the IC 332 may correspond to the communication controlling device for controlling communication. At this point, the wireless communicator may include the transmission circuit 322 and the reception circuit 323. The wireless communicator may further include, in addition to the transmission circuit 322 and the reception circuit 323, the DA conversion circuits 315 and 316, and the AD conversion circuits 317 and 318.

The transmission processing circuit 313 corresponds to the section that performs the processing before DA conversion processing in the transmitter 121 of the PHY&RF unit 120 in FIG. 7. Specifically, the transmission processing circuit 313 mainly performs processing associated with the physical layer including addition of a preamble and a PHY header, encoding, modulation, and generates, for example, two types of digital baseband signals (hereinafter referred to as the digital I-signal and Q-signal). In the case of the MIMO transmission, the two kind of digital baseband signals are created for each stream.

The communication processing device of this embodiment corresponds, for example, to the control circuit 312, the transmission processing circuit 313, and the reception processing circuit 314. The communication processing device of this embodiment may take either configuration of a one-chip IC configuration or a multiple-chip IC configuration.

The DA conversion circuits 315 and 316 correspond to the section associated with the digital-to-analog conversion in the transmitter 21 of the PHY&RF unit 120 in FIG. 7. The DA conversion circuits 315 and 316 are configured to perform digital-to-analog conversion for the signals input from the transmission processing circuit 313. More specifically, the DA conversion circuit 315 converts a digital I-signal into an analog I-signal, and the DA conversion circuit 316 converts a digital Q-signal into an analog Q-signal. It should be noted that there may be a case where the signals are transmitted as single-channel signals without the quadrature modulation being performed. In this case, it suffices that one single DA conversion circuit is provided. In addition, when transmission signals of one single channel or multiple channels are transmitted in a distributed manner in accordance with the number of antennas, DA conversion circuits may be provided in the number corresponding to the number of the antennas.

The RF unit 321, by way of example, is an RF analog IC or a high-frequency wave IC. The transmitting circuit 322 in the RF unit 321 corresponds to the section associated with the processing following the digital-to-analog conversion out of the functions of the transmitter 121 of the PHY&RF unit 120 illustrated in FIG. 7. The transmitting circuit 322 includes a transmission filter that extracts a signal of a desired bandwidth from the signal of the frame that has been subjected to the digital-to-analog conversion by the DA conversion circuits 315 and 316, a mixer that performs up-conversion for the signal that has been subjected to the filtering to the wireless frequency using a signal having a predetermined frequency supplied from an oscillation device, a pre-amplifier (PA) that performs amplification for the signal that has been subjected to the up-conversion and the like.

The receiving circuit 323 in the RF unit 321 corresponds to the section associated with the processing prior to the analog-to-digital conversion from among the functions of the receiver 122 of the PHY&RF unit 120 in FIG. 7. The receiving circuit 323 includes an LNA (low noise amplifier) that amplifies the signal received by the antenna, a mixer that performs down-conversion of the amplified signal to the baseband using a signal having a predetermined frequency supplied from an oscillation device, a reception filter that extracts a signal of a desired bandwidth from the signal that has been subjected to the down-conversion, and the like. More specifically, the receiving circuit 323 performs quadrature demodulation for the reception signal, which has been subjected to the low noise amplification by a low noise amplifier, by carrier waves with 90 degree phase shift with respect to each other and thus generates an I-signal (In-phase signal) having the same phase as that of the reception signal and a Q-signal (Quad-phase signal) whose phase is delayed by 90 degrees with respect to the reception signal. The signal and the Q-signal are output from receiving circuit 323 after being subjected to the gain adjustment.

The control circuit 312 may control the operation of the transmission filter of the transmitting circuit 322 and the reception filter of the receiving circuit 323. Another controller that controls the transmitting circuit 322 and the receiving circuit 323 may be provided and the same or similar control may be realized by the control circuit 312 sending instructions to that controller.

The AD conversion circuits 317, 318 in the baseband unit 311 correspond to the section that performs the analog-to-digital conversion in the receiver 122 of the PHY&RF unit 120 as illustrated in FIG. 7. The AD conversion circuits 317, 318 perform analog-to-digital conversion for the input signal that is input from the receiving circuit 323. More specifically, the AD conversion circuit 317 converts the I-signal into a digital I-signal and the AD conversion circuit 318 converts the Q-signal into a digital Q-signal. It should be noted that quadrature demodulation may not be performed and only a single-channel signal may be received. In this case, only one AD conversion circuit has to be provided. In addition, when a plurality of antennas are provided, AD conversion circuits in the number corresponding to the number of the antennas may be provided. The reception processing circuit 314 corresponds to the section that performs the reception processing of the physical layer in the receiver 22 of the PHY&RF unit 120 as illustrated in FIG. 7. Specifically, the reception processing circuit 314 performs demodulation processing, decoding processing, and analyzing processing on the preamble and the PHY header and the like. Incidentally, the function of the transmission processor 131 in FIG. 7 may be included in the transmission processing circuit 313, the function of the reception processor 132 may be included in the reception processing circuit 314, and the functions of the access controller 133 and the assignment controller 134 may be included in the control circuit 312.

It should be noted that a switch may be arranged in the RF unit for switching the antenna 111 between the transmitting circuit 322 and the receiving circuit 323. By controlling the switch, the antenna 111 may be connected to the transmitting circuit 322 at the time of transmission and the antenna 111 may be connected to the receiving circuit 323 at the time of reception.

Although the DA conversion circuits 315, 316 and the AD conversion circuits 317, 318 are arranged on the side of the baseband unit 311 in FIG. 12, another configuration may be adopted where they are arranged on the side of the RF unit 321.

It should be noted that the wireless communicator may be formed by the transmitting circuit 322 and the receiving circuit 323. The wireless communicator may be formed by further adding DA conversion circuits 315, 316 and the DA conversion circuits 317, 318 to the transmitting circuit 322 and the receiving circuit 323. The wireless communicator may be formed by including, along with these components, the PHY processing portions (i.e., the modulator and the demodulator) of the transmission processing circuit 313 and the reception processing circuit 314.

Fourth Embodiment

Figure 13:
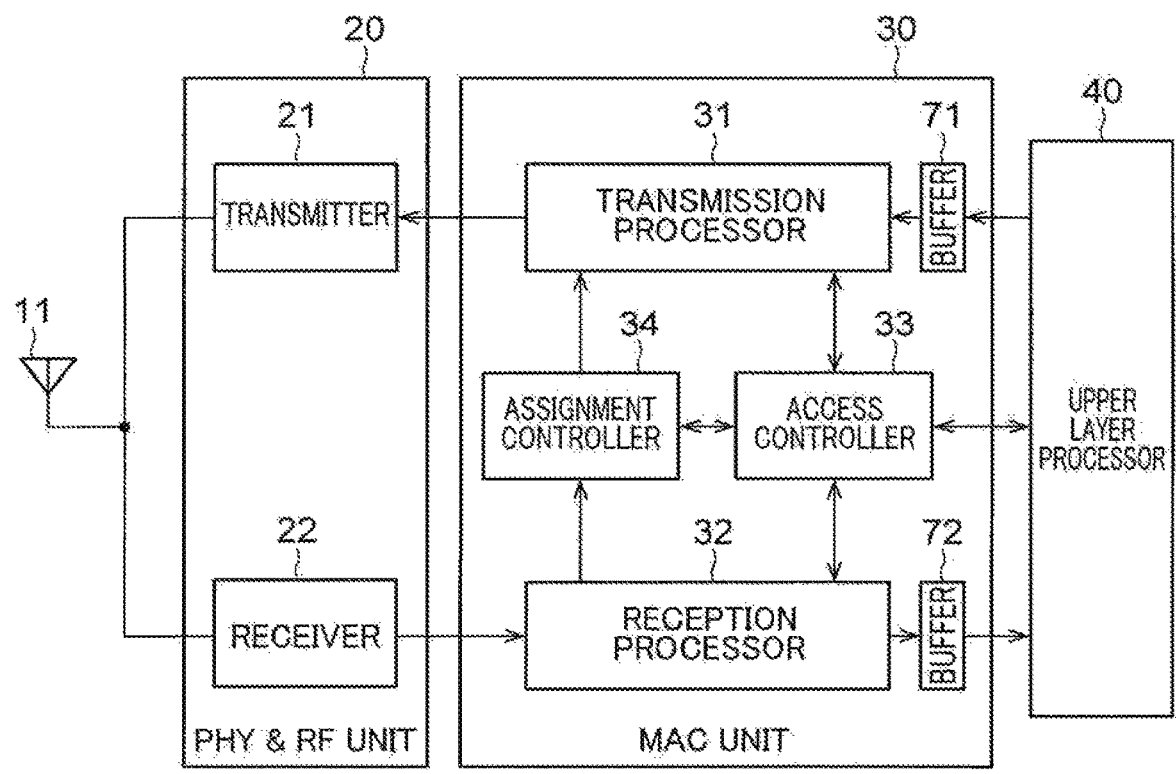
FIG. 13 is a block diagram of a wireless communication device provided in a hub according to a fourth embodiment.

FIG. 13 shows a block diagram of a wireless communication device in a hub according to a fourth embodiment.

In the hub shown in FIG. 13, buffers 71 and 72 are added to the MAC unit 30 of the wireless communication device according to the first embodiment shown in FIG. 6. The buffers 71 and 72 are connected to the transmission processor 31 and the reception processor 32, respectively. The upper layer processor 40 performs input and output with the transmission processor 31 and the reception processor 32 through the buffers 71 and 72. The buffers 71 and 72 can be, for example, arbitrary volatile memories such as DRAM or non-volatile memories such as NAND or MRAM. The buffers 71 and 72 are not memories but not storage mediums such as a HD drive or an SSD. In this way, the buffers 71 and 72 can be provided to hold the transmission data and the reception data in the buffers 71 and 72. The retransmission process, QoS control according to the frame type, the output process to the upper layer processor 40 or the like can be easily performed.

The configuration of adding the buffers can be similarly applied to the node.

Figure 14:
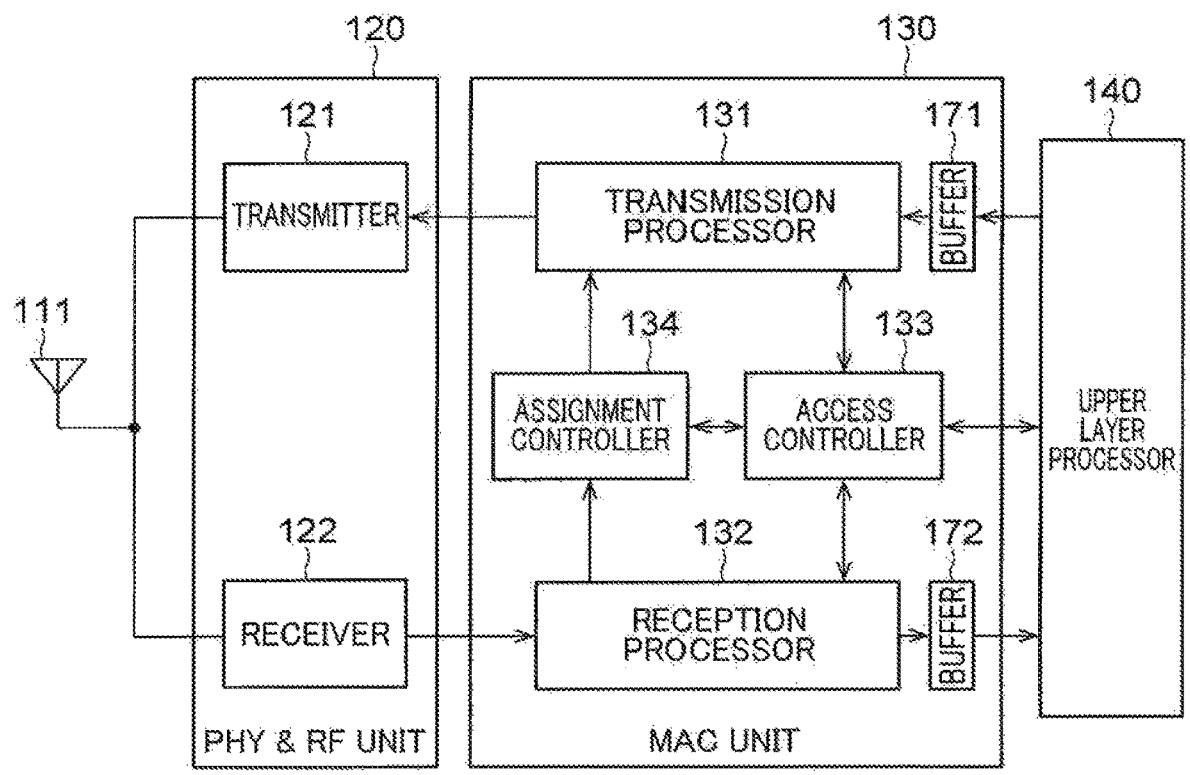
FIG. 14 is a block diagram of a wireless communication device provided in a node according to the fourth embodiment.

FIG. 14 shows a block diagram of a wireless communication device in a node according to the eighth embodiment.

In the node shown in FIG. 14, buffers 171 and 172 are added to the MAC unit 130 of the wireless communication device according to the first embodiment shown in FIG. 7. The buffers 171 and 172 are connected to the transmission processor 131 and the reception processor 132, respectively. The upper layer processor 140 performs input and output with the transmission processor 131 and the reception processor 132 through the buffers 171 and 172. The buffers 171 and 172 can be, for example, arbitrary volatile memories or non-volatile memories. The buffers 171 and 172 can be, for example, arbitrary volatile memories such as DRAM or non-volatile memories such as NAND or MRAM. The buffers 171 and 172 are not memories but not storage mediums such as a HD drive or an SSD. In this way, the buffers 171 and 172 can be provided to hold the transmission data and the reception data in the buffers 171 and 172. The retransmission process, QoS control according to the frame type, the output process to the upper layer processor 140 or the like can be easily performed.

Fifth Embodiment

Figure 16:
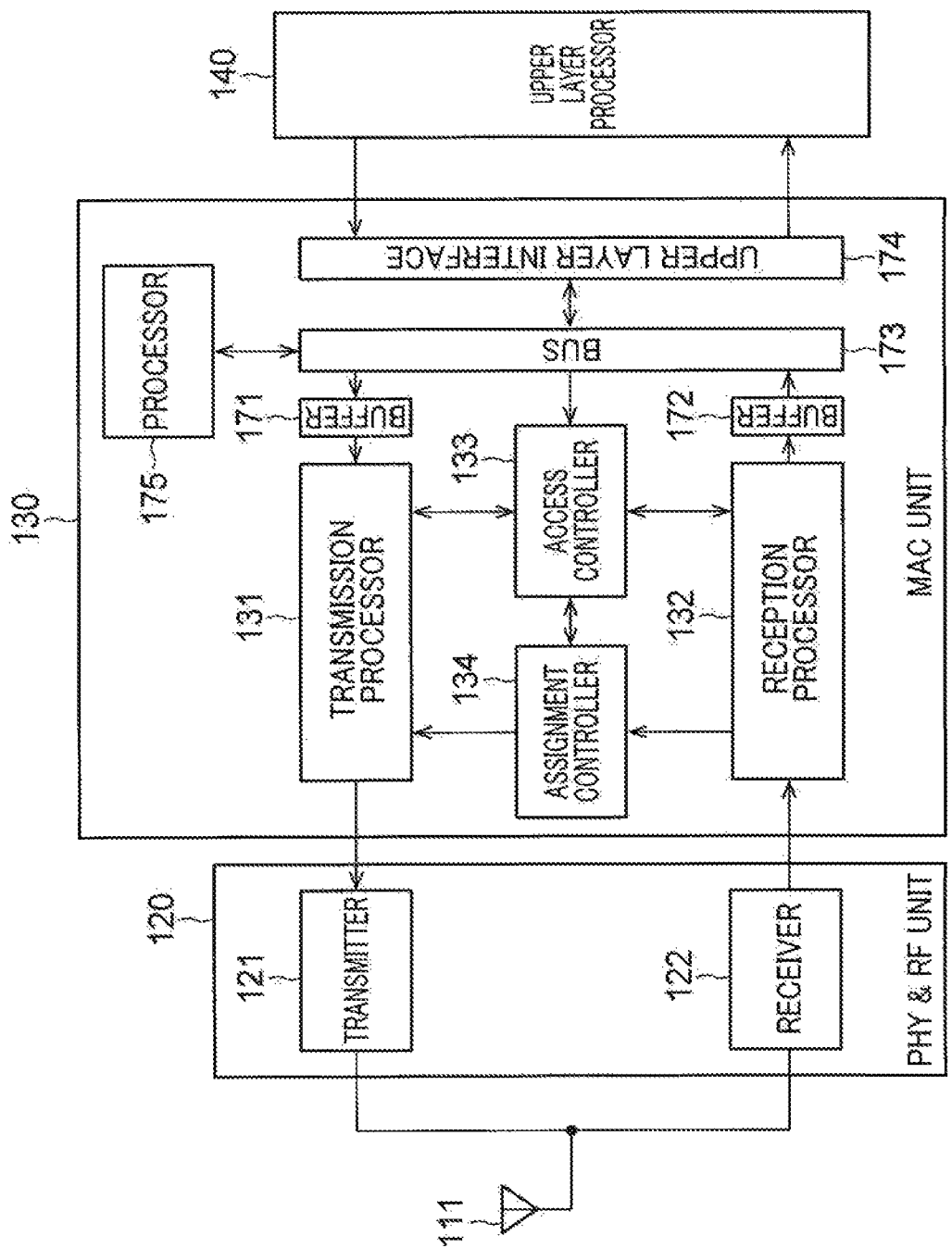
FIG. 16 is a block diagram of a wireless communication device provided in a node according to the fifth embodiment.

FIG. 16 illustrates a block diagram of a wireless communication device in the hub relating to a fifth embodiment.

Figure 15:
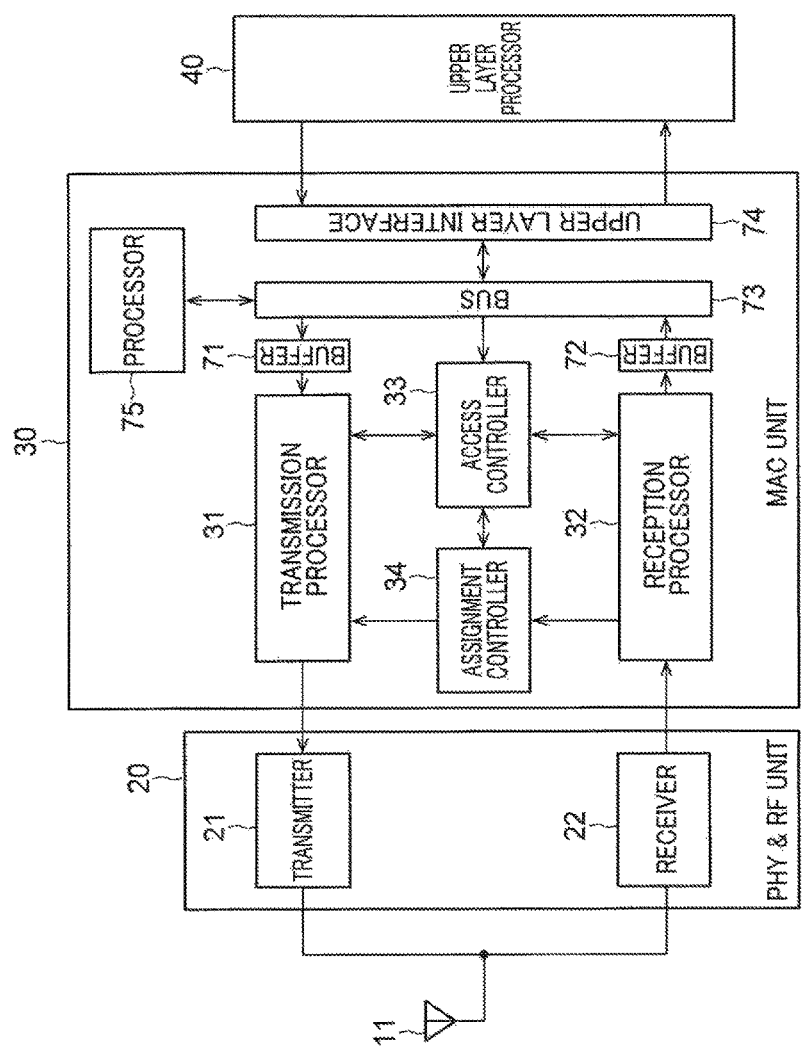
FIG. 15 is a block diagram of a wireless communication device provided in a hub according to a fifth embodiment.

The hub illustrated in FIG. 15 has a form that a bus 73 is connected to the buffers 71 and 72 and the access controller 33 in the fourth embodiment illustrated in FIG. 13, and an upper layer interface 74 and a processor 75 are connected to the bus 73. The MAC unit 30 is connected with the upper layer processor 40 at the upper layer interface 74. In the processor 75, firmware is operated. By rewriting the firmware, functions of the wireless communication device can be easily changed. The function of the access controller 33 may be achieved by the processor 75.

FIG. 16 illustrates a block diagram of a wireless communication device in the node relating to the fifth embodiment.

The node illustrated in FIG. 16 has a form that a bus 173 is connected to the buffers 171 and 172 and the access controller 133 in the fourth embodiment illustrated in FIG. 14, and an upper layer interface 174 and a processor 175 are connected to the bus 173. The MAC unit 130 is connected with the upper layer processor 140 at the upper layer interface 174. In the processor 175, the firmware is operated. By rewriting the firmware, functions of the wireless communication device can be easily changed. The function of the access controller 133 may be achieved by the processor 175.

Sixth Embodiment

Figure 17:
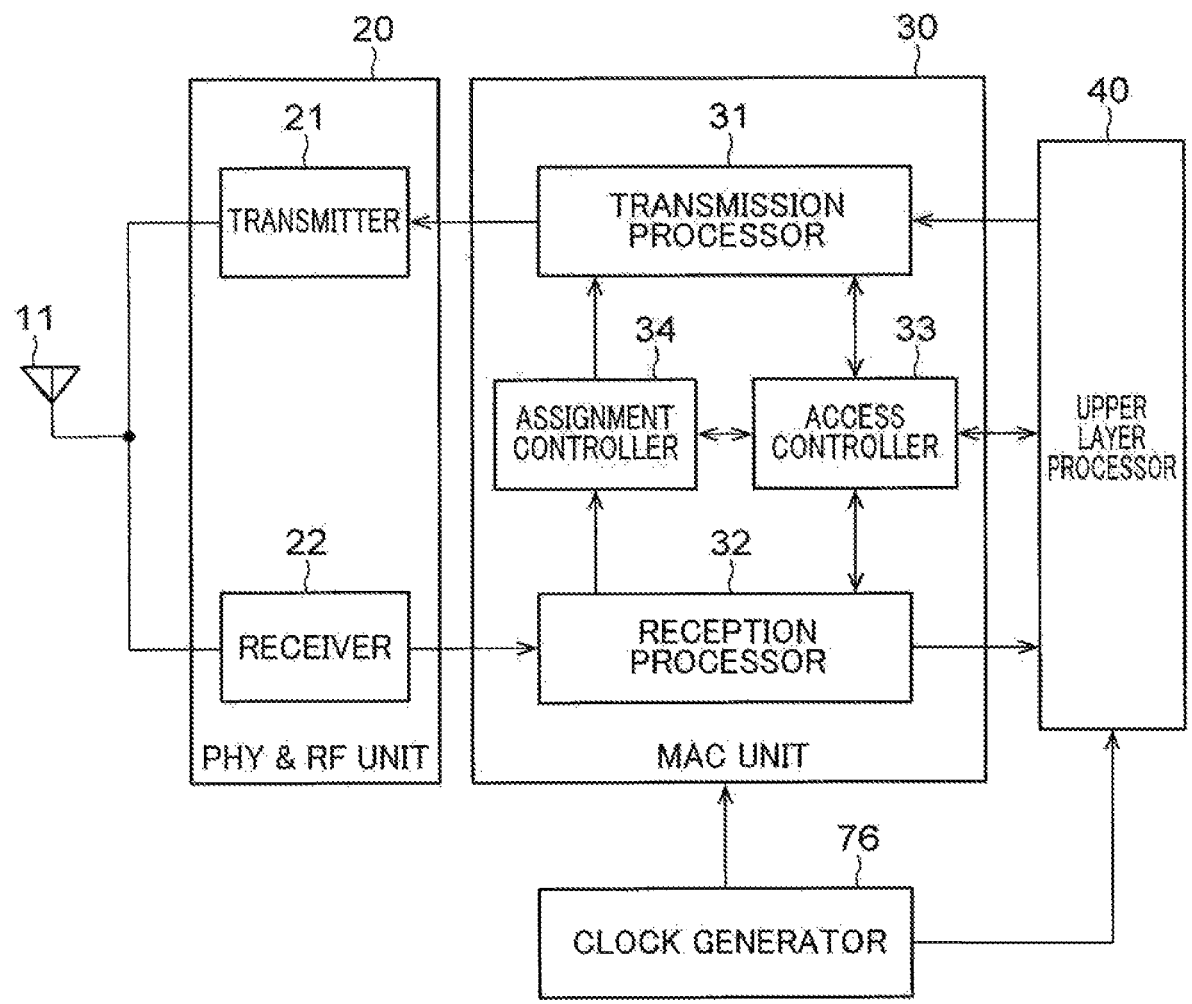
FIG. 17 is a block diagram of a wireless communication device provided in a hub according to a sixth embodiment.

FIG. 17 illustrates a block diagram of a wireless communication device in the hub relating to a sixth embodiment.

The wireless communication device illustrated in FIG. 17 has a form that a clock generator 76 is connected to the MAC unit 30 in the hub relating to the first embodiment illustrated in FIG. 6. The clock generator 76 is connected through an output terminal to an external host (the upper layer processor 40 here), and a clock generated by the clock generator 76 is given to the MAC unit 30 and is also outputted to the external host. By operating the host by the clock inputted from the clock generator 76, a host side and a wireless communication device side can be operated in synchronism. In this example, the clock generator 76 is arranged on the outer side of the MAC unit, however, it may be provided inside the MAC unit.

Figure 18:
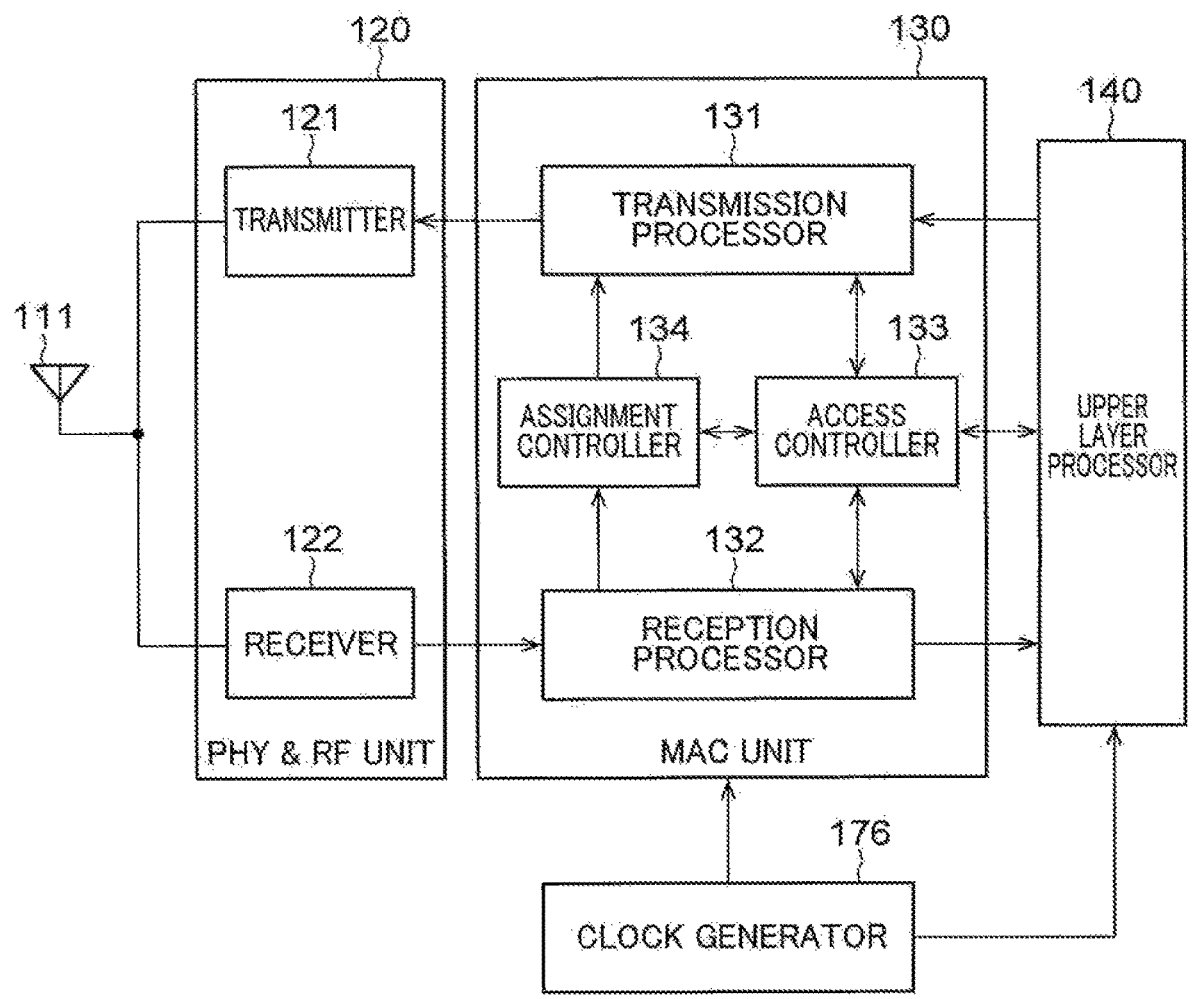
FIG. 18 is a block diagram of a wireless communication device provided in a node according to the sixth embodiment.

FIG. 18 illustrates a block diagram of a wireless communication device in the node relating to the sixth embodiment.

The wireless communication device illustrated in FIG. 18 has a form that a clock generator 176 is connected to the MAC unit 130 in the node relating to the first embodiment illustrated in FIG. 7. The clock generator 176 is connected through an output terminal to an external host (the upper layer processor 140 here), and a clock generated by the clock generator 176 is given to the MAC unit 130 and is also outputted to the external host. By operating the host by the clock inputted from the clock generator 176, the host side and the wireless communication device side can be operated in synchronism. In this example, the clock generator 176 is arranged on the outer side of the MAC unit, however, it may be provided inside the MAC unit.

Seventh Embodiment

Figure 19:
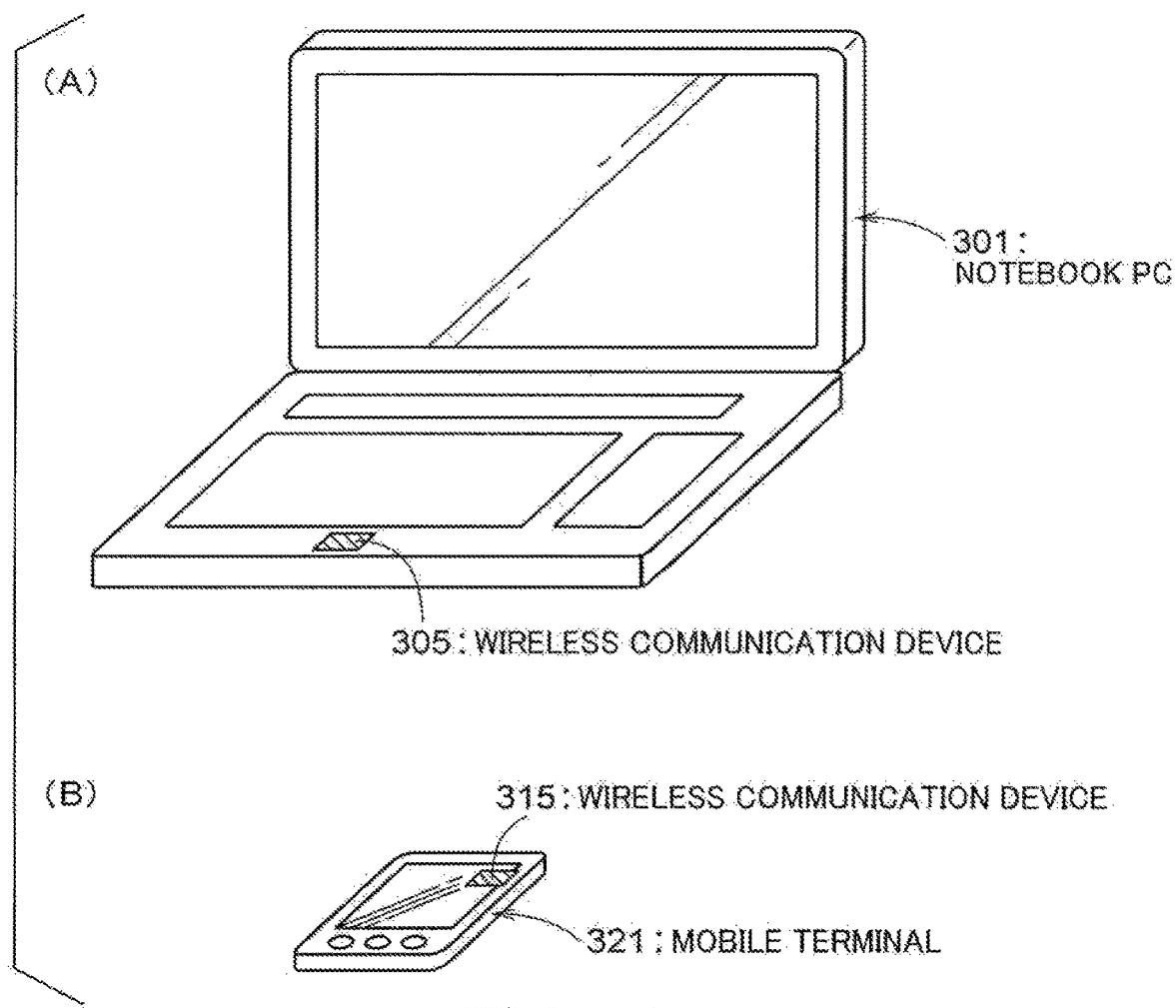
FIG. 19 is a perspective view of a wireless communication terminal according to a seventh embodiment.

FIG. 19(A) and FIG. 19(B) are perspective views of a wireless communication terminal (wireless device) in accordance with a seventh embodiment. The wireless device of FIG. 20(A) is a laptop PC 301 and the wireless device of FIG. 20(B) is a mobile terminal 321. They correspond, respectively, to one form of the terminal (which may operate as either the base station or the slave station). The laptop PC 301 and the mobile terminal 321 incorporate the wireless communication devices 305, 315, respectively. The wireless communication devices that are previously described may be used as the wireless communication devices 305, 315. The wireless device incorporating the wireless communication device is not limited to the laptop PC or the mobile terminal. For example, it can be provided in a TV, a digital camera, a wearable device, a tablet, a smart phone, a gaming device, a network storage device, a monitor, a digital audio player, a web camera, a video camera, a projector, a navigation system, an external adapter, an internal adapter, a set top box, a gateway, a printer server, a mobile access point, a router, an enterprise/service provider access point, a portable device, a handheld device and so on.

Figure 20:
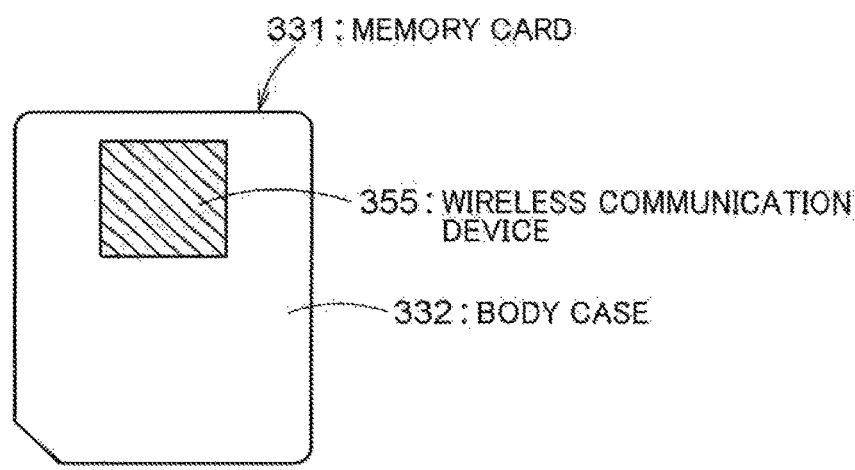
FIG. 20 is a diagram illustrating a memory card according to the seventh embodiment.

In addition, the wireless communication device can be incorporated in a memory card. FIG. 20 illustrates an example where the wireless communication device is incorporated in the memory card. The memory card 331 includes a wireless communication device 355 and a memory card body 332. The memory card 331 uses the wireless communication device 335 for wireless communications with external devices. It should be noted that the illustration of the other elements in the memory card 331 (e.g., memory, etc.) is omitted in FIG. 20.

Eight Embodiment

A eighth embodiment includes a bus, a processor, and an external interface in addition to the configuration of the wireless communication device in accordance with any one of the first to seventh embodiments. The processor and the external interface are connected via the bus to the buffer. The firmware runs on the processor. In this manner, by providing a configuration where the firmware is included in the wireless communication device, it is made possible to readily modify the functionality of the wireless communication device by re-writing of the firmware. The processing unit in which the firmware operates may be a processor that performs the process of the communication controlling device or the controller according to the present embodiment, or may be another processor that performs a process relating to extending or altering the functions of the process of the communication controlling device or the controller. The processing unit in which the firmware operates may be included in the access point or the wireless terminal according to the present embodiment. Alternatively, the processing unit may be included in the integrated circuit of the wireless communication device installed in the access point, or in the integrated circuit of the wireless communication device installed in the wireless terminal.

Ninth Embodiment

A ninth embodiment includes a clock generator in addition to the configuration of the wireless communication device in accordance with any one of the first to seventh embodiments. The clock generator is configured to generate a clock and output the clock on the output terminal and to the outside of the wireless communication device. In this manner, by outputting the clock generated within the wireless communication device to the outside thereof and causing the host side to operate based on the clock output to the outside, it is made possible to cause the host side and the wireless communication device side to operate in a synchronized manner.

Tenth Embodiment

A tenth embodiment includes a power source, a power source controller, and a wireless power supply in addition to the configuration of the wireless communication device in accordance with any one of the first to seventh embodiments. The power source controller is connected to the power source and the wireless power supply, and is configured to perform control for selecting the power source from which power is supplied to the wireless communication device. In this manner, by providing a configuration where the power source is provided in the wireless communication device, it is made possible to achieve low power consumption operation accompanied by the power source control.

Eleventh Embodiment

A eleventh embodiment includes a SIM card in addition to the configuration of the wireless communication device in accordance with the fifteenth embodiment. The SIM card is connected, for example, to the MAC processor in the wireless communication device or to the control circuit 212, etc. In this manner, by providing a configuration where the SIM card is provided in the wireless communication device, it is made possible to readily perform the authentication processing.

Twelfth Embodiment

A twelfth embodiment includes a video compression/extension unit in addition to the configuration of the wireless communication device in accordance with the eighth embodiment. The video compression/extension unit is connected to a bus. In this manner, by configuring the video compression/extension unit included in the wireless communication device, it is made possible to readily perform transfer of the compressed video and the extension of the received compressed video.

Thirteenth Embodiment

A thirteenth embodiment includes an LED unit in addition to the configuration of the wireless communication device in accordance with any one of the first to twelfth embodiments. The LED unit is connected, for example, to the MAC unit in the wireless communication device, the transmission processing circuit, the reception processing circuit, or the control circuit, etc. In this manner, by providing a configuration Where the LED unit is provided in the wireless communication device, it is made possible to readily notify the operating state of the wireless communication device to the user.

Fourteenth Embodiment

A fourteenth embodiment includes a vibrator unit in addition to the configuration of the wireless communication device in accordance with any one of the first to seventh embodiments. The vibrator unit is connected, for example, to the MAC unit in the wireless communication device, the transmission processing circuit, the reception processing circuit, or the control circuit, etc. In this manner, by providing a configuration in which the vibrator unit is provided in the wireless communication device, it is made possible to readily notify the operating state of the wireless communication device to the user.

Fifteenth Embodiment

In an eleventh embodiment, the configuration of the wireless communication device includes a display in addition to the configuration of the wireless communication device according to any one of the first to seventh embodiments. The display may be connected to the MAC unit of the wireless communication device via a bus (not shown). As seen from the above, the configuration including the display to display the operation state of the wireless communication device on the display allows the operation status of the wireless communication device to be easily notified to a user.

Sixteenth Embodiment

Figure 21:
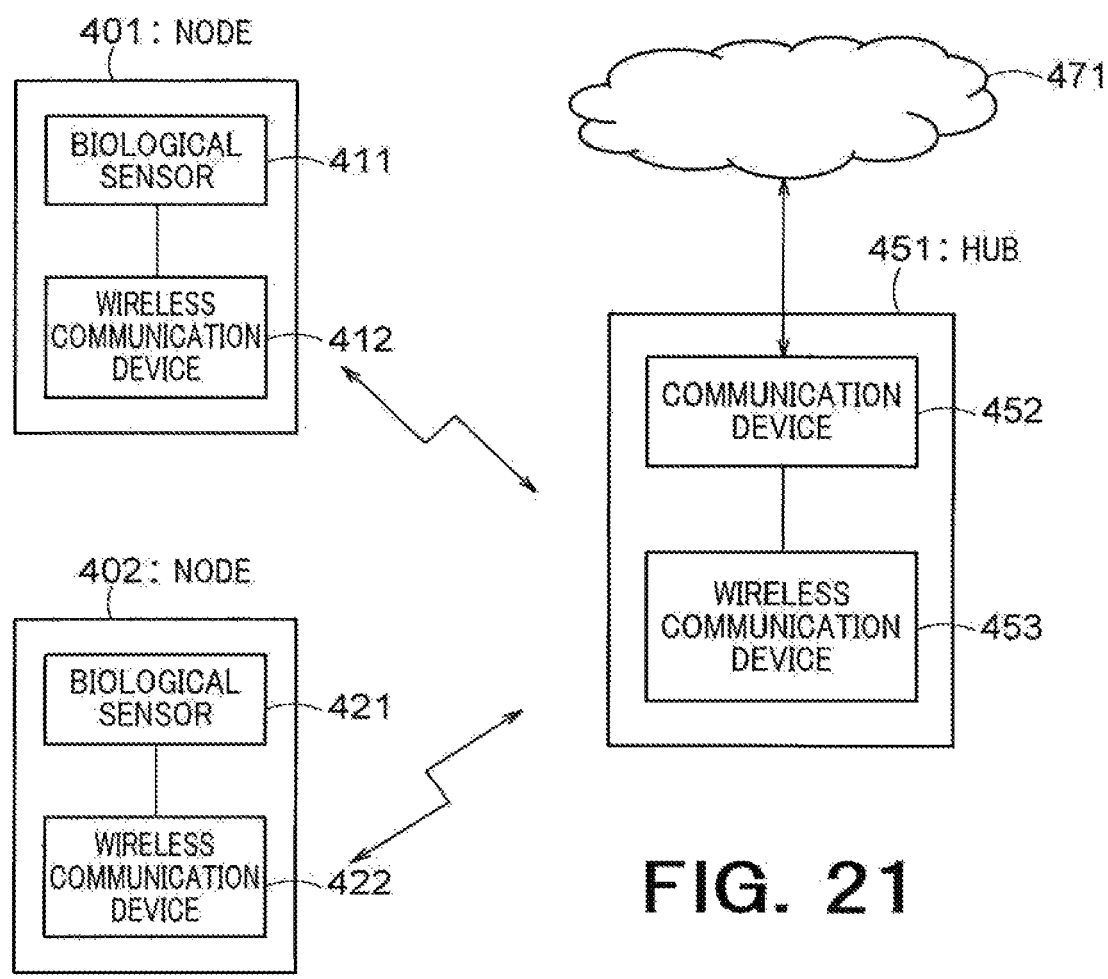
FIG. 21 is a diagram illustrating a wireless communication system according to a sixteenth embodiment.

FIG. 21 illustrates an overall configuration of a wireless communication system in accordance with a sixteenth embodiment. This wireless communication system is an example of the body area network. The wireless communication system includes a plurality of nodes including nodes 401, 402 and a hub 451. Each node and the hub are attached to the human body, and each node performs wireless communication with the hub 451. Being attached to the human body may refer to any case where it is arranged at a position near the human body such as a form in which it is in direct contact with the human body; a form in which it is attached thereto with clothes existing in between; a form in which it is provided on a strap hanging from the neck; and a form in which it is accommodated in a pocket. The hub 451 is, by way of example, a terminal including a smartphone, mobile phone, tablet, laptop PC, etc.

The node 401 includes a biological sensor 411 and a wireless communication device 412. As the biological sensor 411, for example, sensors may be used that are adapted to sense body temperature, blood pressure, pulse, electrocardiogram, heartbeat, blood oxygen level, urinal sugar, blood sugar, etc. Meanwhile, sensors adapted to sense biological data other than these may be used. The wireless communication device 412 is any one of the wireless communication devices of the embodiments that are described in the foregoing. The wireless communication device 412 performs wireless communication with the wireless communication device 453 of the hub 451. The wireless communication device 412 performs wireless transmission of the biological data (sensing information) sensed by the biological sensor 411 to the wireless communication device 453 of the hub 451. The node 401 may be configured as a device in the form of a tag.

The node 402 includes a biological sensor 421 and a wireless communication device 422. The biological senior 421 and the wireless communication device 422, the explanations of which are omitted, are configured in the same or similar manner as the biological sensor 411 and the wireless communication device 412 of the node 401, respectively.

The hub 451 includes a communication device 452 and a wireless communication device 453. The wireless communication device 453 performs wireless communications with the wireless communication device of each node. The wireless communication device 453 may be the wireless communication device described in the context of the previous embodiments or may be another wireless communication device other than those described in the foregoing as long as it is capable of communications with the wireless communication device of the node. The communication device 452 is wire or wireless-connected to the network 471. The network 471 may be the Internet or a network such as a wireless LAN, or may be a hybrid network constructed by a wired network and a wireless network. The communication device 452 transmits the data collected by the wireless communication device 453 from the individual nodes to devices on the network 471. The delivery of data from the wireless communication device 453 to the communication devices may be performed via a CPU, a memory, an auxiliary storage device, etc. The devices on the network 471 may, specifically, be a server device that stores data, a server device that performs data analysis, or any other server device. The hub 451 may also incorporate a biological sensor in the same or similar manner as the nodes 401 and 402. In this case, the hub 451 also transmits the data obtained by the biological sensor to the devices on the network 471 via the communication device 452. An interface may fee provided in the hub 451 for insertion of a memory card such as an SD card and the like and the data obtained by the biological sensor or obtained from each node may be stored in the memory card. In addition, the hub 451 may incorporate a user inputter configured to input various instructions by the user and a display for image display of the data, etc.

Figure 22:
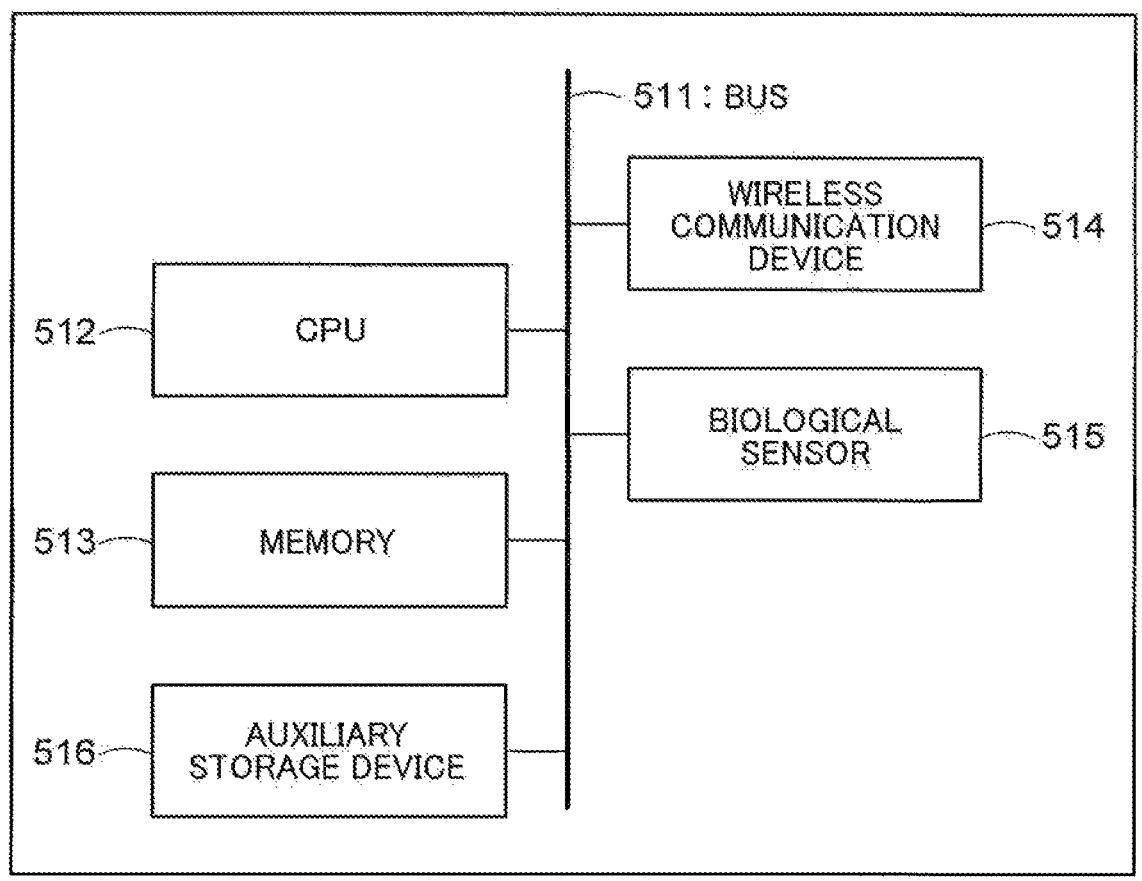
FIG. 22 is a hardware block diagram of a node according to the sixteenth embodiment.

FIG. 22 is a block diagram illustrating a hardware configuration of the node 401 or node 432 illustrated in FIG. 21. The CPU 512, the memory 513, the auxiliary storage device 516, the wireless communication device 514, and the biological sensor 515 are connected to a bus 511. Here, the individual components 512 to 516 are connected to one single bus, but a plurality of buses may be provided by a chipset and the individual units 512 to 516 may be connected in a distributed manner to the plurality of buses. The wireless communication device 514 corresponds to the wireless communication devices 412, 422 of FIG. 21, and the biological sensor 515 corresponds to the biological sensor 411, 421 of FIG. 21. The CPU 512 controls the wireless communication device 514 and the biological sensor 515. The auxiliary storage device 516 is a device that permanently stores data such as an SSD, a hard disk, etc. The auxiliary storage device 516 stores a program to be executed by the CPU 512. In addition, the auxiliary storage device 516 may store data obtained by the biological sensor 515. The CPU 512 reads the program from the auxiliary storage device 516, develops it in the memory 513, and thus executes it. The memory 513 may be volatile memory such as DRAM, etc., or may be non-volatile memory such as MRAM, etc. The CPU 512 drives the biological sensor 515, stores data obtained by the biological sensor 515 in the memory 513 or the auxiliary storage device 516, and transmits the data to the hub via the wireless communication device 514. The CPU 512 may execute processing associated with communication protocols of layers higher than the MAC layer and processing associated with the application layer.

Figure 23:
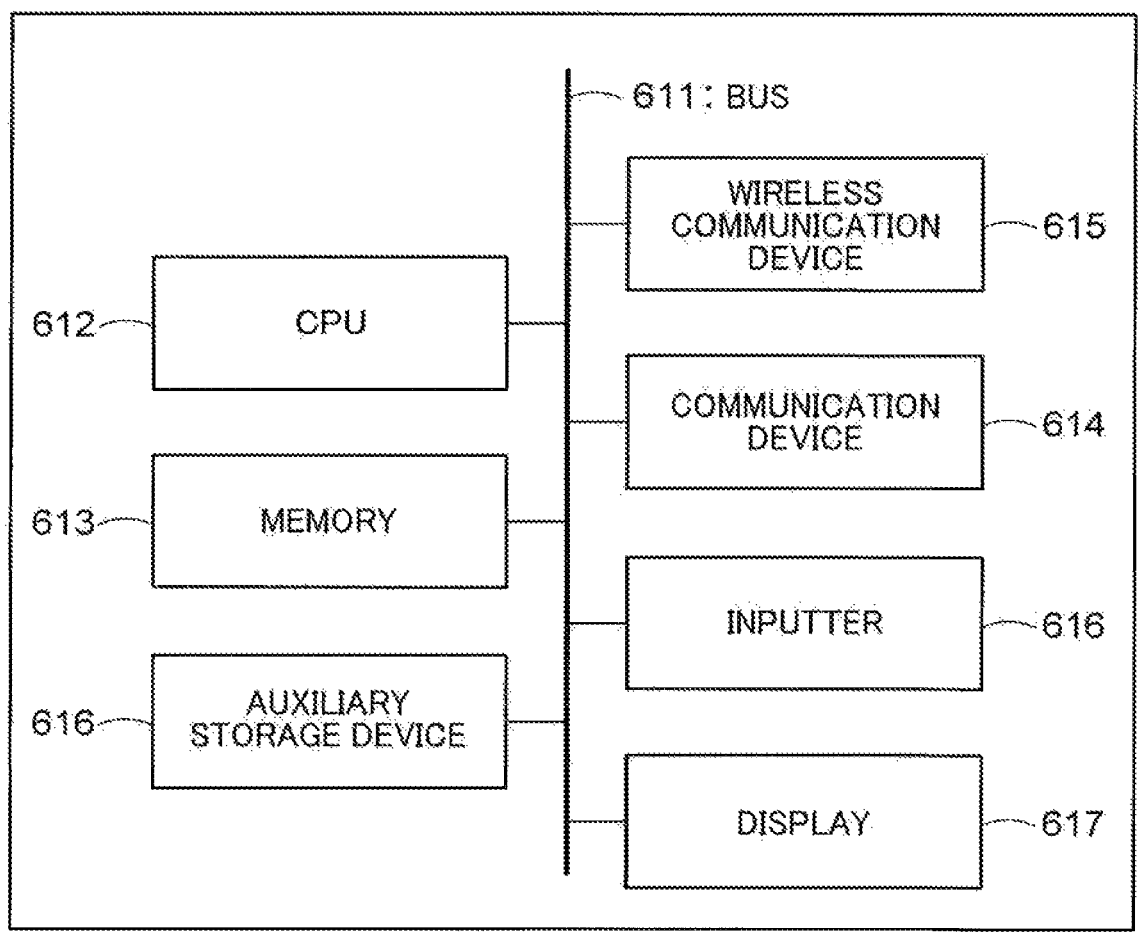
FIG. 23 is a hardware block diagram of a hub according to the sixteenth embodiment.

FIG. 23 is a block diagram that illustrates a hardware configuration of the hub 451 illustrated in FIG. 21. A CPU 612, a memory 613, an auxiliary storage device 616, a communication device 614, a wireless communication device 615, an inputter 616 and a display 617 are connected to a bus 611. Here, the individual units 612 to 617 are connected to one single bus, but a plurality of buses may be provided by a chipset and the individual units 612 to 617 may be connected in a distributed manner to the plurality of buses. A biological sensor or a memory card interface may further be connected to the bus 611. The inputter 616 is configured to receive various instruction inputs from the user and output signals corresponding to the input instructions to the CPU 612. The display 617 provides image display of the data, etc. as instructed by the CPU 612. The communication device 614 and the wireless communication device 615 correspond to the communication device 452 and the wireless communication device 453 provided in the hub of FIG. 21, respectively. The CPU 612 controls the wireless communication device 615 and the communication device 614. The auxiliary storage device 616 is a device that permanently stores data such as an SSD, a hard disk, etc. The auxiliary storage device 616 stores a program executed by the CPU 612 and may store data received from each node. The CPU 612 reads the program from the auxiliary storage device 616, develops it in the memory 613, and executes it. The memory 613 may be volatile memory such as DRAM, etc., or may be non-volatile memory such as MRAM, etc. The CPU 612 stores data received by the wireless communication device 615 from each node in the memory 613 or the auxiliary storage device 616, and transmits the data to the network 471 via the communication device 614. The CPU 612 may execute processing associated with communication protocols of layers higher than the MAC layer and processing associated with the application layer.

The terms used in each embodiment should be interpreted broadly. For example, the term "processor" may encompass a general purpose processor, a central processing unit (CPU), a microprocessor, a digital signal processor (DSP), a controller, a microcontroller, a state machine, and so on. According to circumstances, a "processor" may refer to an application specific integrated circuit (ASIC), a field programmable gate array (FPGA), and a programmable logic device (PLD), etc. The term "processor" may refer to a combination of processing devices such as a plurality of microprocessors, a combination of a DSP and a microprocessor, or one or more microprocessors in conjunction with a DSP core.

As another example, the term "memory" may encompass any electronic component which can store electronic information. The "memory" may refer to various types of media such as a random access memory (RAM), a read-only memory (ROM), a programmable read-only memory (PROM), an erasable programmable read only memory (EPROM), an electrically erasable PROM (EEPROM), a non-volatile random access memory (NVRAM), a flash memory, and a magnetic or optical data storage, which are readable by a processor. It can be said that the memory electronically communicates with a processor if the processor read and/or write information for the memory. The memory may be arranged within a processor and also in this case, it can be said that the memory electronically communication with the processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An electronic apparatus comprising:
transmission circuitry configured to;
transmit a first beacon frame including first information indicative of at least one terminal to be reassigned a slot and a slot reassignment timing,
wherein a beacon interval includes a scheduled access period, a control and management period arranged after the scheduled access period, and an inactive period arranged after the control and management period,
wherein the scheduled access period is used for communication according to an allocated slot,
wherein the control and management period is used for communication of a signal of control or management and
wherein the inactive period is not used for communication,
transmit a management frame including second information indicative of the reassigned slot within a first control and management period included in a first beacon interval between the first beacon frame and a second beacon frame and transmit the second beacon frame, and
reception circuitry configured to receive a first data frame including a bit for acknowledgement of reception in a header within a second beacon interval between the second beacon frame and a third beacon frame, if the management frame is successfully received.

2. The apparatus according to claim 1, wherein the management frame includes;
an identifier of a first terminal to be reassigned a slot,
a field for specifying a slot number of start of one or more slots to be reassigned to the first terminal, and
a field for specifying a slot number of end of the one or more slots to be reassigned to the first terminal.

3. The apparatus according to claim 1, wherein
the reception circuitry is configured to receive the first data frame in which the bit for acknowledgment of reception in the header is set to 1 if the management frame is successfully received, and
the reception circuitry is configured to receive the first data frame in which the bit for acknowledgment of reception in the header is set to 0 if the management frame is unsuccessfully received.

4. The apparatus according to claim 1, wherein the first beacon frame includes
a field for specifying an address of the electronic apparatus,
a field for specifying a length of a beacon interval,
a field for specifying a slot number of start of a control and management period,
a field for specifying a slot number of start of an inactive period,
a field for specifying information of an identifier of at least one terminal, and
a field for specifying a sequence number of a beacon frame associated with a slot reassignment timing.

5. The apparatus according to claim 1, wherein
the reception circuitry is configured to receive a second data frame via the reassigned slot after the reception circuitry receives the first data frame in which a bit for acknowledgment of reception in a header is set to 1 and after the slot reassignment timing passes.

6. The apparatus according to claim 1, wherein
the electronic apparatus is attached to a biological body, and forms a body area network with the at least one terminal, and
the reception circuitry receives a data frame including sensing information acquired by a biosensor from the biological body.

7. The apparatus according to claim 1, wherein
the electronic apparatus is arranged on an object, and forms a network with the at least one terminal, and
the object is different from a living body, the living body including a human body, an animal or plant.

8. The apparatus according to claim 1, comprising
a processor configured to execute firmware; and
at least one antenna,
wherein the transmission circuitry transmits the first beacon frame via the at least one antenna and
the reception circuitry receives the first data frame via the at least one antenna.

9. The apparatus according to claim 1, comprising
a host processor configured to perform at least a process of an upper layer than a MAC layer; and
a clock generator,
wherein at least the reception circuitry and the transmission circuitry are included in a wireless communication apparatus,
a clock signal generated by the clock generator is supplied to both the host processor and the wireless communication apparatus, and
the wireless communication apparatus and host processor operate according to the clock signal.

10. The apparatus according to claim 1, comprising at least one of an LED, a vibrator and a display,
wherein the apparatus notifies a user of an operation state of the transmission circuitry or the reception circuitry by at least one of the LED, the vibrator and the display.

11. An electronic apparatus comprising:
reception circuitry configured to;
receive a first beacon frame including first information indicative at least one node to be reassigned a slot and a slot reassignment,
wherein a beacon interval of a base station includes a scheduled access period, a control and management period arranged after the scheduled access period and an inactive period arranged after the control and management period,
wherein the scheduled access period is used for communication according to an allocated slot,
wherein the control and management period is used for communication of a signal for control or management and
wherein the inactive period is not used for communication,
receive a management frame including second information indicative the reassigned slot within a first control and management period included in a first beacon interval between the first beacon frame and a second beacon frame and
receive the second beacon frame, and
transmission circuitry configured to transmit a first data frame including a bit for acknowledgement of reception of the management frame in a header within a second beacon interval between the second beacon frame and a third beacon frame if the reception circuitry successfully receives the management frame.

12. The apparatus according to claim 11, wherein
the management frame includes;
an identifier of a first node to be reassigned a slot,
a field for specifying a slot number of start of one or more slots to be reassigned to the first node; and
a field for specifying a slot number of end of the one or more slots to be reassigned to the first node.

13. The apparatus according to claim 11, wherein
the transmission circuitry is configured to transmit the first data frame in which the bit for acknowledgment of reception of the management frame in the header is set to 1 if the reception circuitry successfully receives the management frame, and
the transmission circuitry is configured to transmit the first data frame in which the bit for acknowledgment of reception of the management frame in the header is set to 0 if the reception circuitry unsuccessfully receives the management frame.

14. The apparatus according to claim 11, wherein
the first beacon frame includes
a field for specifying an address of a hub,
a field for specifying a length of a beacon interval,
a field for specifying a slot number of start of a control and management period,
a field for specifying a slot number of start of an inactive period,
a field for specifying information of an identifier of at least one node, and
a field for specifying a sequence number of a beacon frame associated with a slot reassignment timing.

15. The apparatus according to claim 11, wherein
the transmission circuitry is configured to transmit a second data frame via the reassigned slot after the transmission circuitry transmits the first data frame in which a bit for acknowledgment of reception of the management frame in a header is set to 1 and after the slot reassignment timing passes.

16. The apparatus according to claim 11, wherein
the electronic apparatus is attached to a biological body, and forms a body area network with the base station corresponding to a hub, and
the transmission circuitry transmits a data frame including sensing information acquired by a biosensor from the biological body.

17. The apparatus according to claim 11, wherein
the electronic apparatus is arranged on an object, and forms a network with the base station corresponding to a hub, and
the object is different from a living body, the living body including a human body, an animal or plant.

18. The apparatus according to claim 11, comprising
a processor configured to execute firmware; and
at least one antenna,
wherein the reception circuitry receives the first beacon frame via the at least one antenna and
the transmission circuitry transmits the first data frame via the at least one antenna.

19. The apparatus according to claim 11, comprising
a host processor configured to perform at least a process of an upper layer than a MAC layer; and
a cloak generator,
wherein at least the transmission circuitry and the reception circuitry are included in a wireless communication apparatus,
a clock signal generated by the clock generator is supplied to both the host processor and the wireless communication apparatus, and
the wireless communication apparatus and the host processor operate according to the clock signal.

20. The apparatus according to claim 11, comprising at least one of an LED, a vibrator and a display,
wherein the apparatus notifies a user of an operation state of the transmission circuitry or the reception circuitry by at least one of the LED, the vibrator and the display.

21. A wireless communication method at least partially performed by an electronic apparatus, comprising:
transmitting a first beacon frame including first information indicative at least one terminal to be reassigned a slot and a slot reassignment timing,
wherein beacon interval includes a scheduled access period, a control and management period arranged after the scheduled access period and an inactive period arranged after the control and management period,
wherein the scheduled access period is used for communication according to an allocated slot,
wherein the control and management period is used for communication of a signal for control or management and
wherein the inactive period is not used for communication;
transmitting a management frame including second information indicative the reassigned slot within a first control and management period included in a first beacon interval between the first beacon frame and a second beacon frame;
transmitting the second beacon frame; and
receiving a first data frame including a bit for acknowledgement of reception of the management frame in a header within a second beacon interval between the second beacon frame and a third beacon frame if the management frame is successfully received.

22. The matted according to claim 21, wherein
the management frame includes;
an identifier of a first terminal to be reassigned a slot,
a field for specifying a slot number of start of or more slots to be reassigned to the first terminal, and
a field for specifying a slot number of end of the one or more slots to be reassigned to the first terminal.

23. The method according to claim 21, comprising:
receiving the first data frame in which the bit for acknowledgment of reception in the header is set to 1 if the management frame is successfully received; and
receiving the first data frame in which the bit for acknowledgment of reception in the header is set to 0 if the management frame is unsuccessfully received.

24. The method according to claim 21, wherein
the first beacon frame includes
a field for specifying an address of the electronic apparatus,
a field for specifying a length of a beacon interval,
a field for specifying a slot number of start of a control and management period,
a field for specifying a slot number of start of an inactive period, a field for specifying information of an identifier of at least one terminal, and
a field for specifying a sequence number of a beacon frame associated with a slot reassignment timing.

25. The method according to claim 21, comprising
receiving a second data frame via the reassigned slot after the first data frame in which a bit for acknowledgment of reception in a header is set to 1 is received and after the slot reassignment timing passes.

26. The method according to claim 21, wherein
the electronic apparatus is attached to a biological body, and forms a body area network with the at least one terminal, and
the method comprises receiving a data frame including sensing information acquired by a biosensor from the biological body.

27. The method according to claim 21, wherein
the electronic apparatus arranged on an object, and forms a network with the at least one terminal, and
the object is different from a living body, the living body including a human body, an animal or plant.

28. The method according to claim 21, comprising
executing firmware in a processor,
the method comprises;
transmitting the first beacon frame via at least one antenna, and
receiving the first data frame via the at least one antenna.

29. The method according to claim 21, comprising
performing at least a process of an upper layer than a MAC layer in a host processor;
performing transmission of the first beacon frame, the management frame and the second beacon frame and reception of the first data frame in a wireless communication apparatus;
supplying a clock signal generated by a clock generator to both the host processor and the wireless communication apparatus; and
operating the wireless communication apparatus and the host processor according to the clock signal.

30. The method according to claim 21, comprising:
performing transmission of the first beacon frame, the management frame and the second beacon frame in transmission circuitry and performing reception of the first data frame in reception circuitry; and
notifying a user of an operation state of the transmission circuitry or the reception circuitry by at least one of an LED, a vibrator and a display.

31. A wireless communication method at least partially performed by an electronic apparatus, comprising:
receiving a first beacon frame including first information indicative at least one node to be reassigned and a slot reassignment timing,
wherein a beacon interval of a base station includes a scheduled access period, a control and management period arranged after the scheduled access period and an inactive period arranged after the control and management period,
wherein the scheduled access period is used for communication according to an allocated slot,
wherein the control and management period is used for communication of a signal for control a management and
wherein the inactive period is not used for communication;
receiving a management frame including second information indicative a reassigned slot within a first control and management period included in a first beacon interval between the first beacon frame and a second beacon frame;
receiving the second beacon frame;
transmitting a first data frame including a bit for acknowledgement of reception of the management frame in a header within a second beacon interval between the second beacon frame and a third beacon frame if the management frame is successfully received.

32. The method according claim 31, wherein
the management frame includes;
an identifier of a first node to be reassigned a slot,
a field for specifying a slot number of start of one or more slots to be reassigned to the first node, and
a field for specifying a slot number of end of the one or more slots to be reassigned to the first node.

33. The method according to claim 31, comprising:
transmitting the first data frame in which the bit for acknowledgment of reception of the management frame in the header is set to 1 if the management frame is successfully received, and
transmitting the first data frame in which the bit for acknowledgment of reception of the management frame in the header is set to 0 if the management frame is unsuccessfully received.

34. The method according to claim 31, wherein
the first beacon frame includes
a field for specifying an address of a hub,
a field far specifying a length of a beacon interval,
a field for specifying a slot number of start of a control and management period,
a field for specifying a slot number of start of an inactive period,
a field for specifying information of an identifier of at least one node, and
a field for specifying a sequence number of a beacon frame associated with a slot reassignment timing.

35. The method according to claim 31, comprising
transmitting a second data frame via the reassigned slot after the first data frame in which a bit for acknowledgment of reception of the management frame in a header is set to 1 is transmitted and after the slot reassignment timing passes.

36. The method according to claim 31, wherein
the electronic apparatus is attached to a biological body, and forms a body area network with the base station corresponding to a hub, and
the method comprises transmitting a data frame including sensing information acquired by a biosensor from the biological body.

37. The method according to claim 31, wherein
the electronic apparatus is arranged on an object, and forms a network with the base station corresponding to a hub, and
the object is different from a living body, the living body including a human body, an animal or plant.

38. The method according to claim 31, comprising
executing firmware in a processor,
the method comprises receiving the first beacon frame via at least one antenna and
the method comprises transmitting the first data frame via the at least one antenna.

39. The method according to claim 31, comprising
performing at least a process of an upper layer than a MAC layer in a host processor;
performing reception of the first beacon frame, the management frame and the second beacon frame and transmission of the first data frame in a wireless communication apparatus;
supplying a clock signal generated by a clock generator to both the host processor and the wireless communication apparatus; and
operating the wireless communication apparatus and the host processor according to the clock signal.

40. The method according to claim 31, comprising:
performing reception of the first beacon frame, the management frame and the second beacon frame in reception circuitry and performing transmission of the first
data frame in transmission circuitry; and notifying a user of an operation state of the reception
circuitry or the transmission circuitry by at least one of
an LED, a vibrator and a display.

\* \* \* \* \*